US012077983B2

(12) United States Patent
Duckwall et al.

(10) Patent No.: US 12,077,983 B2
(45) Date of Patent: Sep. 3, 2024

(54) KEY AND KEY BLANKS OPERABLE IN VERTICALLY AND HORIZONTALLY ORIENTED KEYWAYS

(71) Applicant: ASSA ABLOY HIGH SECURITY GROUP INC., Salem, VA (US)

(72) Inventors: Thomas Duckwall, Roanoke, VA (US); Peter H. Field, Salem, VA (US); Clyde T. Roberson, Salem, VA (US); Douglas E. Trent, Roanoke, VA (US)

(73) Assignee: ASSA ABLOY HIGH SECURITY GROUP INC., Salem, VA (US)

( * ) Notice: Subject to any disclaimer, the term of this patent is extended or adjusted under 35 U.S.C. 154(b) by 812 days.

(21) Appl. No.: 17/156,260

(22) Filed: Jan. 22, 2021

(65) Prior Publication Data

US 2021/0230901 A1 Jul. 29, 2021

Related U.S. Application Data

(60) Provisional application No. 62/965,395, filed on Jan. 24, 2020.

(51) Int. Cl.
*E05B 19/00* (2006.01)
*E05B 15/08* (2006.01)
(Continued)

(52) U.S. Cl.
CPC .......... *E05B 19/0064* (2013.01); *E05B 15/08* (2013.01); *E05B 15/14* (2013.01);
(Continued)

(58) Field of Classification Search
CPC .......... E05B 15/08; E05B 15/14; E05B 19/00; E05B 19/0017; E05B 19/0023;
(Continued)

(56) References Cited

U.S. PATENT DOCUMENTS

| | | | |
|---|---|---|---|
| 567,305 | A | 9/1896 | Donovan |
| 1,439,012 | A | 12/1922 | Long |

(Continued)

FOREIGN PATENT DOCUMENTS

| | | | |
|---|---|---|---|
| AT | 505825 | A2 | 4/2009 |
| CN | 105927040 | A | 9/2016 |

(Continued)

OTHER PUBLICATIONS

International Search Report and Written Opinion issued in corresponding International Application No. PCT/US2021/014794, dated Sep. 1, 2021, (22 pages).

(Continued)

*Primary Examiner* — Christopher J Boswell
(74) *Attorney, Agent, or Firm* — Rothwell, Figg, Ernst & Manbeck, P.C.

(57) ABSTRACT

A key or key blank includes a key blade having a first edge, a second edge, and first and second opposed sides. The first edge has one or more edge bittings to elevate and/or rotate one or more tumbler pins of a lock with a vertically-oriented keyway, and one of the opposed sides has one or more side bittings to elevate and/or rotate one or more tumbler pins of a lock with a horizontally-oriented keyway. Side warding surfaces on the key blank are shaped and positioned to minimize the interference of peaks between the skewed bitting cuts on the key. A lock has a keyway configured for the key having edge bittings to elevate and/or rotate one or more tumbler pins of a vertical lock and side bittings to elevate and/or rotate one or more tumbler pins of a horizontal lock.

45 Claims, 21 Drawing Sheets

(51) Int. Cl.

| | |
|---|---|
| ***E05B 15/14*** | (2006.01) |
| ***E05B 27/00*** | (2006.01) |
| ***E05B 27/10*** | (2006.01) |

(52) U.S. Cl.

CPC ...... *E05B 19/0023* (2013.01); *E05B 27/0017* (2013.01); *E05B 27/0021* (2013.01); *E05B 27/0039* (2013.01); *E05B 27/0082* (2013.01); *E05B 27/0085* (2013.01); *E05B 27/10* (2021.08)

(58) Field of Classification Search

CPC ............. E05B 19/0035; E05B 19/0041; E05B 19/0064; E05B 27/0017; E05B 27/0021; E05B 27/0032; E05B 27/0039; E05B 27/0082; E05B 27/0085; E05B 27/0089; E05B 27/02; E05B 27/10

See application file for complete search history.

(56) References Cited

U.S. PATENT DOCUMENTS

| | | | | | |
|---|---|---|---|---|---|
| 1,863,525 | A | | 6/1932 | Long | |
| 1,900,185 | A | | 3/1933 | Long | |
| 3,499,302 | A | | 3/1970 | Spain et al. | |
| 3,869,888 | A | | 3/1975 | Yoshizawa | |
| 4,111,021 | A | | 9/1978 | Roberts | |
| 4,116,025 | A | | 9/1978 | Wolter | |
| 4,343,166 | A | | 8/1982 | Hofmann | |
| 4,723,427 | A | * | 2/1988 | Oliver | E05B 27/0082 70/494 |
| 4,815,307 | A | * | 3/1989 | Widen | E05B 27/0039 70/378 |
| 5,101,648 | A | | 4/1992 | Kuster | |
| 5,475,997 | A | | 12/1995 | Chung | |
| 5,682,779 | A | * | 11/1997 | Dolev | E05B 27/0039 70/411 |
| 5,797,287 | A | * | 8/1998 | Prunbauer | E05B 27/0042 70/358 |
| 5,943,890 | A | | 8/1999 | Field et al. | |
| 6,023,954 | A | | 2/2000 | Field | |
| 7,207,200 | B2 | * | 4/2007 | Eden, Jr. | E05B 27/0042 70/358 |
| 7,552,608 | B2 | | 6/2009 | Field et al. | |
| 8,448,485 | B1 | | 5/2013 | Widen | |
| 9,045,915 | B2 | | 6/2015 | Field et al. | |
| 9,051,760 | B2 | * | 6/2015 | Herrmann | E05B 27/0017 |
| 9,097,035 | B2 | | 8/2015 | Litwinski | |
| 9,157,256 | B2 | | 10/2015 | Hiscocks et al. | |
| 9,353,548 | B2 | * | 5/2016 | Fustini | E05B 27/0017 |
| 9,359,793 | B2 | | 6/2016 | Field et al. | |
| 9,416,561 | B2 | | 8/2016 | Field et al. | |
| 9,482,031 | B2 | | 11/2016 | Field et al. | |
| 9,771,738 | B2 | | 9/2017 | Field et al. | |
| 11,499,340 | B1 | * | 11/2022 | Kim | E05B 19/0064 |
| 2011/0079059 | A1 | * | 4/2011 | Piotrowski | E05B 27/0042 70/378 |
| 2012/0266640 | A1 | | 10/2012 | Daugherty | |
| 2018/0119451 | A1 | | 5/2018 | Zuraski et al. | |

FOREIGN PATENT DOCUMENTS

| | | | |
|---|---|---|---|
| DE | 1052855 | B | 3/1959 |
| EP | 0334396 | A2 | 9/1989 |
| EP | 0566701 | A1 | 10/1993 |
| EP | 0613987 | A1 | 9/1994 |
| EP | 0778382 | A1 | 6/1997 |
| EP | 1288869 | A2 | 3/2003 |
| EP | 2407616 | B1 | 4/2015 |
| EP | 3214238 | A1 | 9/2017 |
| ES | 2423846 | A2 | 9/2013 |
| FR | 897613 | A | 3/1945 |
| FR | 931117 | A | 2/1948 |
| FR | 1103989 | A | 11/1955 |
| FR | 2039193 | A1 | 1/1971 |
| FR | 2522351 | A1 | 9/1983 |
| FR | 2674279 | B1 | 6/1994 |
| GB | 209518 | A | 1/1924 |
| GB | 2275736 | A | 9/1994 |
| GB | 2453625 | A | 4/2009 |
| JP | S60105773 | A | 6/1985 |
| SE | 410115 | B | 9/1979 |
| SE | 9302195 | | 12/1994 |
| TW | 201011152 | A | 3/2010 |
| WO | 9309317 | A1 | 5/1993 |
| WO | 2003060263 | A1 | 7/2003 |
| WO | 2010004235 | A1 | 1/2010 |
| WO | 2013033960 | A1 | 3/2013 |

OTHER PUBLICATIONS

Partial International Search Report and Provisional Opinion issued in corresponding Application No. PCT/US2021/014794, May 17, 2021, 16 pages.

Canadian Office Action dated Oct. 3, 2023 in related Canadian patent application No. 3, 168,929 (4 pages).

* cited by examiner

KEY AND KEY BLANKS OPERABLE IN VERTICALLY AND HORIZONTALLY ORIENTED KEYWAYS

CROSS REFERENCE OF RELATED APPLICATION

This application claims the benefit under 35 U.S.C. § 119(e) of the filing date of U.S. provisional patent application Ser. No. 62/965,395 filed Jan. 24, 2020, the disclosure of which is incorporated herein by reference.

FIELD OF THE DISCLOSURE

This disclosure relates to improvements in keys and key blanks, particularly a key blank configured to receive bittings for both a lock with a horizontally-oriented keyway and a lock with a vertically-oriented keyway. In embodiments, the key blank may receive bittings only for a horizontally-oriented keyway, only for a vertically-oriented keyway, or for both horizontally- and vertically-oriented keyways.

BACKGROUND

Locks having a keyway with a horizontal orientation and locks having a keyway with a vertical orientation are known in the art. Examples of locks having vertically-oriented keyways include U.S. Pat. Nos. 3,499,302; 9,359,793; and 5,943,890, where the side faces of the key blade have a greater width than the top and bottom edges of the key blade. For an example of a horizontal keyway, U.S. Pat. No. 6,023,954 discloses a lock with a generally horizontal keyway and a key blade having large upper and lower surfaces connected by two short side edges or surfaces, providing the blade with a width greater than its thickness. The flat key blade has a plurality of bittings cut into the upper surface which extend across and through at least a portion of the upper surface from one side edge toward the other side edge. The bittings cut through a portion of the thickness of the blade so as to pass through one of the side edges, but preferably not the other side edge. Additional examples of locks with horizontally-oriented keyways include U.S. Pat. Nos. 9,416,561 and 9,771,738.

To introduce a new product line of cylinder locks having different complexities of locking mechanisms and security levels, it is important to have supporting locksmith and service centers to provide duplicate keys for the products. Techniques to reduce the inventory of key blanks that a service center must maintain are beneficial to product acceptance by the service personnel. Having many cylinder locks with the same keyway shape reduces the cost to produce the various types of cylinders and the cost of having to produce and stock many different key blanks to service the products for the end user.

A key blade has to be full height where the detainers, or tumbler pins, contact the key, but other portions of the blade are reduced to create unique key shapes. The shape of the key must be thinner than the keyway in a cylinder lock plug for the key to fit and operate. The shape of the key blade usually corresponds to the shape of the keyway in the cylinder lock. Bitting shapes require careful engineering to provide unique shapes that will support and position the tumbler pins at a correct location.

Where the tumbler pins contact the key blade, the bittings are cut into the blade to allow the key to position the tumbler pins at a location that allows the plug to rotate (i.e., at a shear line between the cylinder and the cylinder housing), thereby allowing the cylinder lock to open. Different locking mechanisms used in various cylinder locks have tumbler pins that contact the blade at various locations. These different locking mechanisms, such as levers, ward pins, common pins, and rotating pins, are formed with various techniques. For example, keys for the cylinder locks can be cut with rotary cutters, drilled with tapered holes, or formed with milling cutters to produce the necessary bittings to support and position these different tumbler pin types. In a certain cylinder locks, the tumbler pins must seat on the bitting in the key blade at a specific height, and the tumbler pins must also rotate to a correct angle for the lock to open. Skew cut bittings formed in the key blade cause the associated tumbler pins to rotate. Cutting the skew cut bittings that are necessary for rotating the tumbler pins produces vertices at the bitting peaks that often interfere with the rotation of the pins as the key is inserted. The key blank shapes must be carefully designed to eliminate these unwanted peaks.

SUMMARY

The following presents a simplified summary in order to provide a basic understanding of some aspects described herein. This summary is not an extensive overview of the claimed subject matter. It is intended to neither identify key or critical elements of the claimed subject matter nor delineate the scope thereof. Its sole purpose is to present some concepts in a simplified form as a prelude to the more detailed description that is presented later.

Aspects of this disclosure pertain to keys and key blanks that are designed to operate two different types of lock cylinders, vertically-oriented and horizontally-oriented lock cylinders.

Aspects of the disclosure are directed to a key blank adapted to be formed into a key for operating a cylinder lock with tumbler pins and a vertically-oriented keyway and a cylinder lock with tumbler pins and a horizontally-oriented keyway. The key blank may include a key blade having a first edge, a second edge, a first side surface extending between the first edge and the second edge, and an opposed, second side surface extending between the first edge and the second edge. The first edge is adapted to have formed thereon one or more edge bittings configured to elevate and rotate tumbler pins of a cylinder lock with a vertically-oriented keyway, and the first side surface is adapted to have formed thereon one or more side bittings configured to elevate and rotate tumbler pins of a cylinder lock with a horizontally-oriented keyway.

According to further aspects of the disclosure, the key blade includes warding grooves and ridges on at least one of the first side surface and the second side surface that match the vertically-oriented keyway and the horizontally-oriented keyway so that the key blade can be inserted into both the vertically-oriented keyway and the horizontally-oriented keyway.

According to further aspects of the disclosure, the key blank may include a longitudinal rib on the first side surface and extending along at least a portion of the blade, wherein the first side surface is adapted to receive the one or more side bittings in the longitudinal rib and a portion of the first side surface above the longitudinal rib.

According to further aspects of the disclosure, the first edge is adapted to receive one or more skewed edge bittings.

According to further aspects of the disclosure, the first side surface is adapted to receive one or more skewed side bittings.

According to further aspects of the disclosure, the first side surface is adapted to receive one or more side bittings extending to the second edge of the blade.

According to further aspects of the disclosure, the first side surface is adapted to receive one or more side bittings extending from the second edge of the blade to beyond a longitudinal axis of the blade.

According to further aspects of the disclosure, the key blade is divided into three segments between the first edge and the second edge, the segments comprising. A first segment may be encompassed by a first envelope defined by the first edge of the key blade, a first side boundary, a second side boundary, and a lower edge. The first side boundary and the second side boundary of the first envelope have a first thickness therebetween, and the first side boundary and the second side boundary of the first envelope are equidistant from a centerline extending through the blade from the first edge of the blade to the second edge of the blade. A second segment is encompassed by a second envelope defined by an upper boundary contiguous with the lower boundary of the first segment, a first side boundary, a second side boundary, and a lower boundary. The first side boundary and the second side boundary of the second envelope have a second thickness therebetween, the first side boundary and the second side boundary of the second envelope are equidistant from the centerline, and the second thickness is greater than the first thickness. A third segment is encompassed by a third envelope defined by an upper boundary contiguous with the lower boundary of the second segment, a first side boundary, a second side boundary, and the second edge of the key blade. The first side boundary and the second side boundary of the third envelope have a third thickness therebetween, the distance from the centerline to the second side boundary of the third envelope is equal to the distance from the centerline to the second side boundary of the second envelope, and the third thickness is greater than the first thickness and the second thickness.

According to further aspects of the disclosure, the first side surface is adapted to receive one or more side bittings in the first side boundary of the third segment.

According to further aspects of the disclosure, the key blade further includes a warding groove formed in at least one of the second segment and the third segment that extends to a depth beyond the centerline.

According to further aspects of the disclosure, the first side surface of the key blade and the second side surface of the key blade comprise horizontal warding surfaces, and the horizontal warding surfaces are perpendicular to a vertical axis extending from the first edge of the blade to the second edge of the blade.

According to further aspects of the disclosure, a portion of the key blade is symmetric with respect to a centerline extending from the first edge of the blade to the second edge of the blade and a portion of the key blade is asymmetric with respect to the centerline, the first edge of the blade adapted to receive the one or more edge bittings is part of the symmetric portion of the blade, and the first side surface adapted to receive the one or more side bittings is part of the asymmetric portion of the blade.

According to further aspects of the disclosure, the key blade further includes a warding groove formed in the first side surface or the second side surface that extends to a depth beyond a centerline extending from the first edge to the second edge.

According to further aspects of the disclosure, the key blade may include an edge bevel extending from a distal end of the blade to the first edge of the blade and configured to guide tumbler pins of a cylinder lock with a vertically-oriented keyway to the first edge of the key blade as the key blade is inserted into the vertically-oriented keyway and a side bevel extending from a distal end of the blade to the first side surface of the blade and configured to guide tumbler pins of a cylinder lock with a horizontally-oriented keyway to the first side surface of the key blade as the key blade is inserted into the horizontally-oriented keyway.

According to further aspects of the disclosure, the keyway corresponds to a shape of the key blade of the key blank of claim 1.

According to further aspects of the disclosure, the keyway is a vertically-oriented keyway.

According to further aspects of the disclosure, the keyway is a horizontally-oriented keyway.

Aspects of the disclosure are directed to a key for a lock. The key may include a key blade having a top edge, a bottom edge, a first side surface, and an opposed second side surface. The first side surface may include one or more side bittings configured to elevate and rotate one or more tumbler pins of a horizontal lock. The blade may be divided into three segments between the top edge and the bottom edge, the segments comprising. A first segment is encompassed by a first envelope defined by the top edge of the key blade, a first side boundary, a second side boundary, and a lower boundary. The first side boundary and the second side boundary of the first envelope have a first thickness therebetween, and the first side boundary and the second side boundary of the first envelope are equidistant from a centerline extending through the blade from the top edge of the blade to the bottom edge of the blade. A second segment is encompassed by a second envelope defined by an upper boundary contiguous with the lower boundary of the first segment, a first side boundary, a second side boundary, and a lower boundary. The first side boundary and the second side boundary of the second envelope have a second thickness therebetween, the first side boundary and the second side boundary of the second envelope are equidistant from the centerline, and the second thickness is greater than the first thickness. A third segment is encompassed by a third envelope defined by an upper boundary contiguous with the lower boundary of the second segment, a first side boundary, a second side boundary, and the bottom edge of the key blade. The first side boundary and the second side boundary of the third envelope have a third thickness therebetween, and the distance from the centerline to the second side boundary of the third envelope is equal to the distance from the centerline to the second side boundary of the second envelope, and the third thickness is greater than the first thickness and the second thickness.

According to further aspects of the disclosure, the key may include a longitudinal rib on the first side surface and extending along at least a portion of the blade, and the side bittings are formed in the longitudinal rib and a portion of the first side surface above the longitudinal rib.

According to further aspects of the disclosure, the top edge may include one or more edge bittings configured to elevate and rotate one or more vertically-oriented tumbler pins of a vertical lock.

According to further aspects of the disclosure, at least one the one or more side bittings extends to the bottom edge of the key blade.

According to further aspects of the disclosure, the side bittings do not extend through more than half of the thickness of the key blade.

According to further aspects of the disclosure, each side bitting has a base at an angle of 70-110 degrees with respect to a longitudinal axis of the blade.

According to further aspects of the disclosure, at least one of the one or more side bittings extends from the bottom edge of the key blade to beyond a longitudinal axis of the key blade.

According to further aspects of the disclosure, each side bitting has a base at an angle of 70-110 degrees with respect to the longitudinal axis of the blade.

According to further aspects of the disclosure, the thickness of first segment envelope is about 0.060 inch, the thickness of the second segment envelope is about 0.093 inch, and the thickness of third segment envelope is about 0.125 inch.

According to further aspects of the disclosure, the first side surface of the key blade and the second side surface of the key blade comprise horizontal warding surfaces between the top edge of the key blade and a maximum depth of a valley of the edge bitting, and the horizontal warding surfaces are perpendicular to a vertical axis extending from the top edge of the blade to the bottom edge of the blade.

According to further aspects of the disclosure, the first side surface of the key blade and the second side surface of the key blade comprise horizontal warding surfaces and outwardly-extending warding surfaces between the top edge of the key blade and a maximum depth of a valley of the edge bitting.

According to further aspects of the disclosure, the maximum depth of a valley of an edge bitting is not more than two-thirds the height of an unbitted key blade.

According to further aspects of the disclosure, the blade has only vertical warding surfaces cut into the first side surface.

According to further aspects of the disclosure, at least one of the first side surface and the second side surface of the key blade comprises at least one vertical warding surface and at least one horizontal warding surfaces.

Aspects of the disclosure are directed to a keyway having a shape corresponding to the shape of the keys describe herein.

Aspects of the disclosure ad directed to a key for a lock. The key may include a key blade having a top edge, a bottom edge, a first side surface, and an opposed second side surface, and edge bittings formed on the top edge of the key blade. The edge bittings may include at least two adjacent bitting cuts forming a bitting peak therebetween, and the two adjacent bitting cuts are formed at different angles with respect to a longitudinal axis of the key blade. The first side surface of the key blade and the second side surface of the key blade may include horizontal warding surfaces between a top edge of the bitting peak and a maximum depth of the at least two bitting cuts.

According to further aspects of the disclosure, the key may further include side bittings formed on the first or second side surface of the key blade, and the side bittings may include at least two adjacent bitting cuts forming a bitting peak therebetween, and the two adjacent bitting cuts are formed at different angles with respect to a longitudinal axis of the key blade.

Aspects of the disclosure to a lock system. The lock system may include a vertical cylinder lock including a housing, a cylinder rotatably disposed within the housing, and a vertically-oriented keyway within the cylinder. The vertically-oriented keyway has a height and a width that is less than the height, and wherein the vertically-oriented keyway is configured to receive a key blade having a first edge, a second edge, a first side surface, and an opposed second side surface defining a cross sectional shape of the key blade. The cross sectional shape of a key blade of the vertically oriented keyway is configured to receive is divided into three blade segments between the first edge and the second edge, the segments. A first blade segment is encompassed by a first envelope defined by the first edge of the key blade, a first side boundary contacting a portion of the first side surface of the key blade, a second side boundary contacting a portion of the second side surface of the key blade, and a lower boundary. The first side boundary and the second side boundary of the first envelope have a first thickness therebetween, and the first side boundary and the second side boundary of the first envelope are equidistant from a centerline extending through the key blade from the first edge of the key blade to the second edge of the key blade. A second blade segment is encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary. The first side boundary and the second side boundary of the second envelope have a second thickness therebetween, the first side boundary and the second side boundary of the second envelope are equidistant from the centerline, and the second thickness is greater than the first thickness. A third blade segment is encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade. The first side boundary and the second side boundary of the third envelope have a third thickness therebetween, the distance from the centerline to the second side boundary of the third envelope is equal to the distance from the centerline to the second side boundary of the second envelope, and the third thickness is greater than the first thickness and the second thickness. The vertically-oriented keyway is divided into first, second, and third keyway segments along its height. The first keyway segment corresponds to the first blade segment, the second keyway segment corresponds to the second blade segment, and the third keyway segment corresponds to the third blade segment. At least one twisting tumbler pin is oriented within the cylinder so as to be parallel to the height of the vertically-oriented keyway and configured to be elevated and rotated by a complementary bitting formed on a first edge of a key inserted into the keyway. The lock system also includes a horizontal cylinder lock including a housing, a cylinder rotatably disposed within the housing, and a horizontally-oriented keyway within the cylinder. The horizontally-oriented keyway has a height and a width that is greater than the height, and the horizontally-oriented keyway is configured to receive a key blade having a first edge, a second edge, a first side surface, and an opposed second side surface defining a cross sectional shape of the key blade that is divided into the same first blade segment, second blade segment, and third blade segment as the cross sectional shape of the key blade the vertically-oriented keyway of the vertical cylinder lock is configured to receive. The horizontally-oriented keyway is divided into first, second, and third keyway segments along its width, and the second keyway segment corresponds to the second blade segment and the third keyway segment corresponds to the third blade segment. At least one twisting tumbler pin is oriented within the cylinder so as to be parallel to the height of the keyway and is configured to be elevated and rotated by a complementary bitting formed on a first side surface of a key inserted into the keyway, and the tumbler pin of the horizontal cylinder lock is primarily aligned with the third keyway segment of the horizontally-oriented keyway. The system further includes a key with a blade having a first edge, a second edge, a first side surface, and an opposed second side surface defining a cross sectional shape such that the key can be inserted into both the vertically-oriented keyway of the vertical cylinder lock and the horizontally-oriented keyway of the horizontal cylinder lock. The cross sectional shape of the key may be defined by at least one blade segment corresponding to the third keyway segment of the vertically-oriented keyway of the vertical cylinder lock and the third keyway segment of the horizontally-oriented keyway of the horizontal cylinder lock, and the key has at least a bitting formed on the first side surface of the key and configured to elevate and rotate the at least one tumbler pin of the horizontal cylinder lock.

According to further aspects of the disclosure, the key has a bitting formed on the first edge and configured to elevate and rotate the at least one tumbler of the vertical cylinder lock.

According to further aspects of the disclosure, the cross sectional shape of the key blade is defined by three blade segments. A first blade segment is encompassed by a first envelope defined by the first edge of the key blade, a first side boundary contacting a portion of the first side surface of the key blade, a second side boundary contacting a portion of the second side surface of the key blade, and a lower boundary. The first side boundary and the second side boundary of the first envelope have a first thickness therebetween, and the first side boundary and the second side boundary of the first envelope are equidistant from a centerline extending through the key blade from the first edge of the key blade to the second edge of the key blade. A second blade segment is encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary. The first side boundary and the second side boundary of the second envelope have a second thickness therebetween, the first side boundary and the second side boundary of the second envelope are equidistant from the centerline, and the second thickness is greater than the first thickness. A third blade segment is encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade. The first side boundary and the second side boundary of the third envelope have a third thickness therebetween, the distance from the centerline to the second side boundary of the third envelope is equal to the distance from the centerline to the second side boundary of the second envelope, and the third thickness is greater than the first thickness and the second thickness.

According to further aspects of the disclosure, the at least one bitting formed on the first side surface extends to the second edge of the blade.

According to further aspects of the disclosure, the at least one bitting formed on the first side surface extends from the second edge of the blade to beyond a longitudinal axis of the blade.

According to further aspects of the disclosure, the key blade further includes a warding groove formed in at least one of the second segment and the third segment that extends to a depth beyond the centerline.

According to further aspects of the disclosure, the key blade includes an edge bevel extending from a distal end of the blade to the first edge of the blade and configured to guide tumbler pins of a cylinder lock with a vertically-oriented keyway to the first edge of the key blade as the key blade is inserted into the vertically-oriented keyway and a side bevel extending from a distal end of the blade to the first side surface of the blade and configured to guide tumbler pins of a cylinder lock with a horizontally-oriented keyway to the first side surface of the key blade as the key blade is inserted into the horizontally-oriented keyway.

Aspects of the disclosure are directed key for a horizontal cylinder lock that includes a housing, a cylinder rotatably disposed within the housing, and a horizontally-oriented keyway within the cylinder. The horizontally-oriented keyway has a height and a width that is greater than the height, and the horizontally-oriented keyway is configured to receive a key blade having a first edge, a second edge, a first side surface, and an opposed second side surface defining a cross sectional shape of the key blade, and the cross-sectional shape of the key blade the horizontally-oriented keyway is configured to receive is divided into three blade segments between the first edge and the second edge. A first blade segment is encompassed by a first envelope defined by the first edge of the key blade, a first side boundary contacting a portion of the first side surface of the key blade, a second side boundary contacting a portion of the second side surface of the key blade, and a lower boundary. The first side boundary and the second side boundary of the first envelope have a first thickness therebetween, and the first side boundary and the second side boundary of the first envelope are equidistant from a centerline extending through the key blade from the first edge of the key blade to the second edge of the key blade. A second blade segment is encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary. The first side boundary and the second side boundary of the second envelope have a second thickness therebetween, the first side boundary and the second side boundary of the second envelope are equidistant from the centerline, and the second thickness is greater than the first thickness. A third blade segment is encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade. The first side boundary and the second side boundary of the third envelope have a third thickness therebetween, the distance from the centerline to the second side boundary of the third envelope is equal to the distance from the centerline to the second side boundary of the second envelope, and the third thickness is greater than the first thickness and the second thickness. The horizontally-oriented keyway is divided into first, second, and third keyway segments along its height, and the first keyway segment corresponds to the first blade segment, the second keyway segment corresponds to the second blade segment, and the third keyway segment corresponds to the third blade segment. The horizontal cylinder lock further includes at least one twisting tumbler pin oriented within the cylinder so as to be parallel to the height of the horizontally-oriented keyway and configured to be elevated and rotated by a complementary bitting formed on a first side of a key inserted into the keyway. The key may include a blade having a first edge, a second edge, a first side surface, and an opposed second side surface defining a cross sectional shape such that the key can be inserted into the horizontally-oriented keyway of the horizontal cylinder lock. The cross sectional shape of the key may be defined by only one blade segment corresponding to the third keyway segment of the horizontally-oriented keyway of the horizontal cylinder lock and lacking any blade segment that corresponds to the first or second keyway segments of the horizontally-oriented keyway, or only two blade segments corresponding to the second and third keyway segments of the horizontally-oriented keyway of the horizontal cylinder lock and lacking any blade segment that corresponds to the first keyway segment of the horizontally-oriented keyway. The blade includes at least one bitting formed on the first side surface of the blade, and wherein the at least one bitting is configured to elevate and rotate the at least one tumbler pin of the horizontal cylinder lock.

According to further aspects of the disclosure, the at least one bitting formed on the first side surface extends to the second edge of the blade.

According to further aspects of the disclosure, the at least one bitting formed on the first side surface extends from the second edge of the blade to beyond a longitudinal axis of the blade.

Aspects of the disclosure are directed to a method for operating a horizontal cylinder lock. The horizontal cylinder lock includes a housing, a cylinder rotatably disposed within the housing, and a horizontally-oriented keyway within the cylinder. The horizontally-oriented keyway has a height and a width that is greater than the height, and the horizontally-oriented keyway is configured to receive a key blade having a first edge, a second edge, a first side surface, and an opposed second side surface defining a cross sectional shape of the key blade, and the cross-sectional shape of the blade the horizontally-oriented keyway is configured to receive is divided into three blade segments between the first edge and the second edge. A first blade segment is encompassed by a first envelope defined by the first edge of the key blade, a first side boundary contacting a portion of the first side surface of the key blade, a second side boundary contacting a portion of the second side surface of the key blade, and a lower boundary. The first side boundary and the second side boundary of the first envelope have a first thickness therebetween, and the first side boundary and the second side boundary of the first envelope are equidistant from a centerline extending through the key blade from the first edge of the key blade to the second edge of the key blade. A second blade segment is encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary. The first side boundary and the second side boundary of the second envelope have a second thickness therebetween, the first side boundary and the second side boundary of the second envelope are equidistant from the centerline, and the second thickness is greater than the first thickness. A third blade segment is encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade. The first side boundary and the second side boundary of the third envelope have a third thickness therebetween, the distance from the centerline to the second side boundary of the third envelope is equal to the distance from the centerline to the second side boundary of the second envelope, and the third thickness is greater than the first thickness and the second thickness. The horizontally-oriented keyway is divided into first, second, and third keyway segments along its height. The first keyway segment corresponds to the first blade segment, the second keyway segment corresponds to the second blade segment, and the third keyway segment corresponds to the third blade segment. The horizontal cylinder lock further includes at least one twisting tumbler pin oriented within the cylinder so as to be parallel to the height of the horizontally-oriented keyway and configured to be elevated and rotated by a complementary bitting formed on a first side of a key inserted into the keyway. The method may include inserting a key blade into the horizontally-oriented keyway, wherein the key blade has a first edge, a second edge, a first side surface, and an opposed second side surface defining a cross sectional shape such that the key can be inserted into the horizontally-oriented keyway of the horizontal cylinder lock. The cross sectional shape of the key is defined by only one blade segment corresponding to the third keyway segment of the horizontally-oriented keyway of the horizontal cylinder lock and lacking any blade segment that corresponds to the first or second keyway segments of the horizontally-oriented keyway or only two blade segments corresponding to the second and third keyway segments of the horizontally-oriented keyway of the horizontal cylinder lock and lacking any blade segment that corresponds to the first keyway segment of the horizontally-oriented keyway. The blade includes at least one bitting formed on the first side surface of the blade, and the at least one bitting is configured to elevate and rotate the at least one tumbler pin of the horizontal cylinder lock. Inserting the key blade into the horizontally-oriented keyway comprises inserting the segment of blade corresponding to the third keyway segment into the third segment of the keyway.

According to further aspects of the disclosure, the at least one bitting formed on the first side surface extends to the second edge of the blade.

According to further aspects of the disclosure, the at least one bitting formed on the first side surface extends from the second edge of the blade to beyond a longitudinal axis of the blade.

Other features and characteristics of the subject matter of this disclosure, as well as the methods of operation, functions of related elements of structure and the combination of parts, and economies of manufacture, will become more apparent upon consideration of the following description and the appended claims with reference to the accompanying drawings, all of which form a part of this specification, and wherein like reference numerals designate corresponding parts in the various figures.

BRIEF DESCRIPTION OF THE DRAWINGS

The accompanying drawings, which are incorporated herein and form part of the specification, illustrate various embodiments of the subject matter of this disclosure. In the drawings, like reference numbers indicate identical or functionally similar elements.

DETAILED DESCRIPTION

Figure 1:
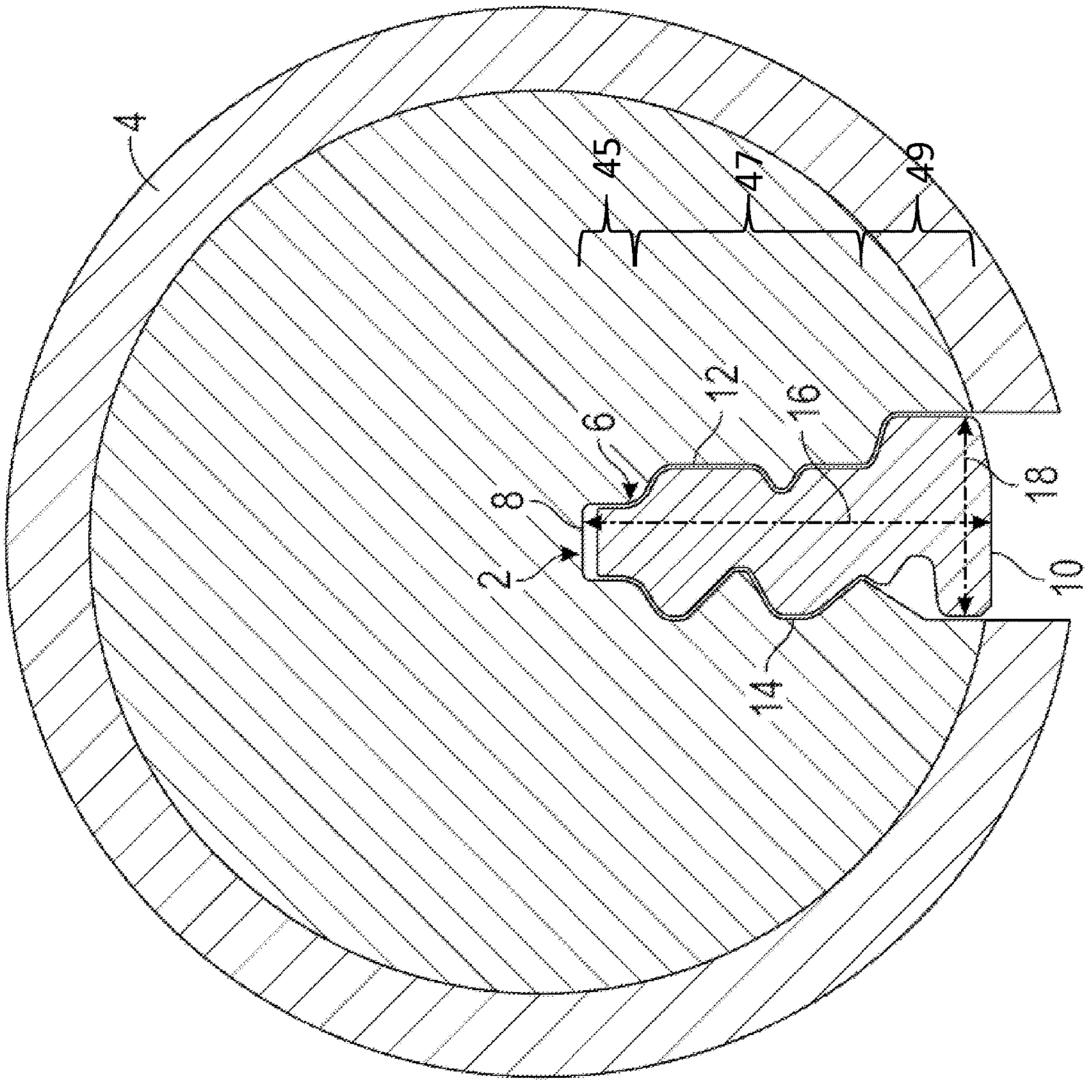
FIG. 1 is transverse cross-sectional view of a key and keyway of a lock with a vertically-oriented keyway.

While aspects of the subject matter of the present disclosure may be embodied in a variety of forms, the following description and accompanying drawings are merely intended to disclose some of these forms as specific examples of the subject matter. Accordingly, the subject matter of this disclosure is not intended to be limited to the forms or embodiments so described and illustrated.

Unless defined otherwise, all terms of art, notations and other technical terms or terminology used herein have the same meaning as is commonly understood by one of ordinary skill in the art to which this disclosure belongs. All patents, applications, published applications and other publications referred to herein are incorporated by reference in their entirety. If a definition set forth in this description is contrary to or otherwise inconsistent with a definition set forth in the patents, applications, published applications, and other publications that are herein incorporated by reference, the definition set forth in this description prevails over the definition that is incorporated herein by reference.

Unless otherwise indicated or the context suggests otherwise, as used herein, "a" or "an" means "at least one" or "one or more."

This description may use various terms describing relative spatial arrangements and/or orientations or directions in describing the position and/or orientation of a component, apparatus, location, feature, or a portion thereof or direction of movement, force, or other dynamic action. Unless specifically stated, or otherwise dictated by the context of the description, such terms, including, without limitation, top, bottom, above, below, under, on top of, upper, lower, left, right, in front of, behind, beneath, next to, adjacent, between, horizontal, vertical, diagonal, longitudinal, transverse, radial, axial, clockwise, counter-clockwise, etc., are used for convenience in referring to such component, apparatus, location, feature, or a portion thereof or movement, force, or other dynamic action in the drawings and are not intended to be limiting.

Unless otherwise indicated, or the context suggests otherwise, terms used herein to describe a physical and/or spatial relationship between a first component, structure, or portion thereof and a second component, structure, or portion thereof, such as, attached, connected, fixed, joined, linked, coupled, or similar terms or variations of such terms, shall encompass both a direct relationship in which the first component, structure, or portion thereof is in direct contact with the second component, structure, or portion thereof or there are one or more intervening components, structures, or portions thereof between the first component, structure, or portion thereof and the second component, structure, or portion thereof.

Furthermore, unless otherwise stated, any specific dimensions mentioned in this description are merely representative of an exemplary implementation of a device embodying aspects of the disclosure and are not intended to be limiting.

To the extent used herein, the term "about" applies to all numeric values and terms indicating specific physical orientations or relationships such as horizontal, vertical, parallel, perpendicular, concentric, or similar terms, specified herein, whether or not explicitly indicated. This term generally refers to a range of numbers, orientations, and relationships that one of ordinary skill in the art would consider as a reasonable amount of deviation to the recited numeric values, orientations, and relationships (i.e., having the equivalent function or result) in the context of the present disclosure. For example, and not intended to be limiting, this term can be construed as including a deviation of +10 percent of the given numeric value, orientation, or relationship, provided such a deviation does not alter the end function or result of the stated value, orientation, or relationship. Therefore, under some circumstances as would be appreciated by one of ordinary skill in the art a value of about 1% can be construed to be a range from 0.9% to 1.1%.

The term "adjacent." if used in the description or any claims, refers to being near or adjoining. Adjacent objects can be spaced apart from one another or can be in actual or direct contact with one another. In some instances, adjacent objects can be coupled to one another or can be formed integrally with one another.

The terms "substantially" and "substantial," if used in the description or any claims, refer to a considerable degree or extent. When used in conjunction with, for example, an event, circumstance, characteristic, or property, the terms can refer to instances in which the event, circumstance, characteristic, or property occurs precisely as well as instances in which the event, circumstance, characteristic, or property occurs to a close approximation, such as accounting for typical tolerance levels or variability of the embodiments described herein.

All possible combinations of elements and components described in the specification or recited in the claims are contemplated and considered to be part of this disclosure. It should be appreciated that all combinations of the foregoing concepts and additional concepts discussed in greater detail below (provided such concepts are not mutually inconsistent) are contemplated as being part of the inventive subject matter disclosed herein. In particular, all combinations of claimed subject matter appearing at the end of this disclosure are contemplated as being part of the inventive subject matter disclosed herein.

In the appended claims, the term "including" is used as the plain-English equivalent of the respective term "comprising." The terms "comprising" and "including" are intended herein to be open-ended, including not only the recited elements, but further encompassing any additional elements. Moreover, in the following claims, the terms "first," "second," and "third," etc. are used merely as differentiating labels, and are not intended to impose numerical requirements on their objects.

Figure 2:
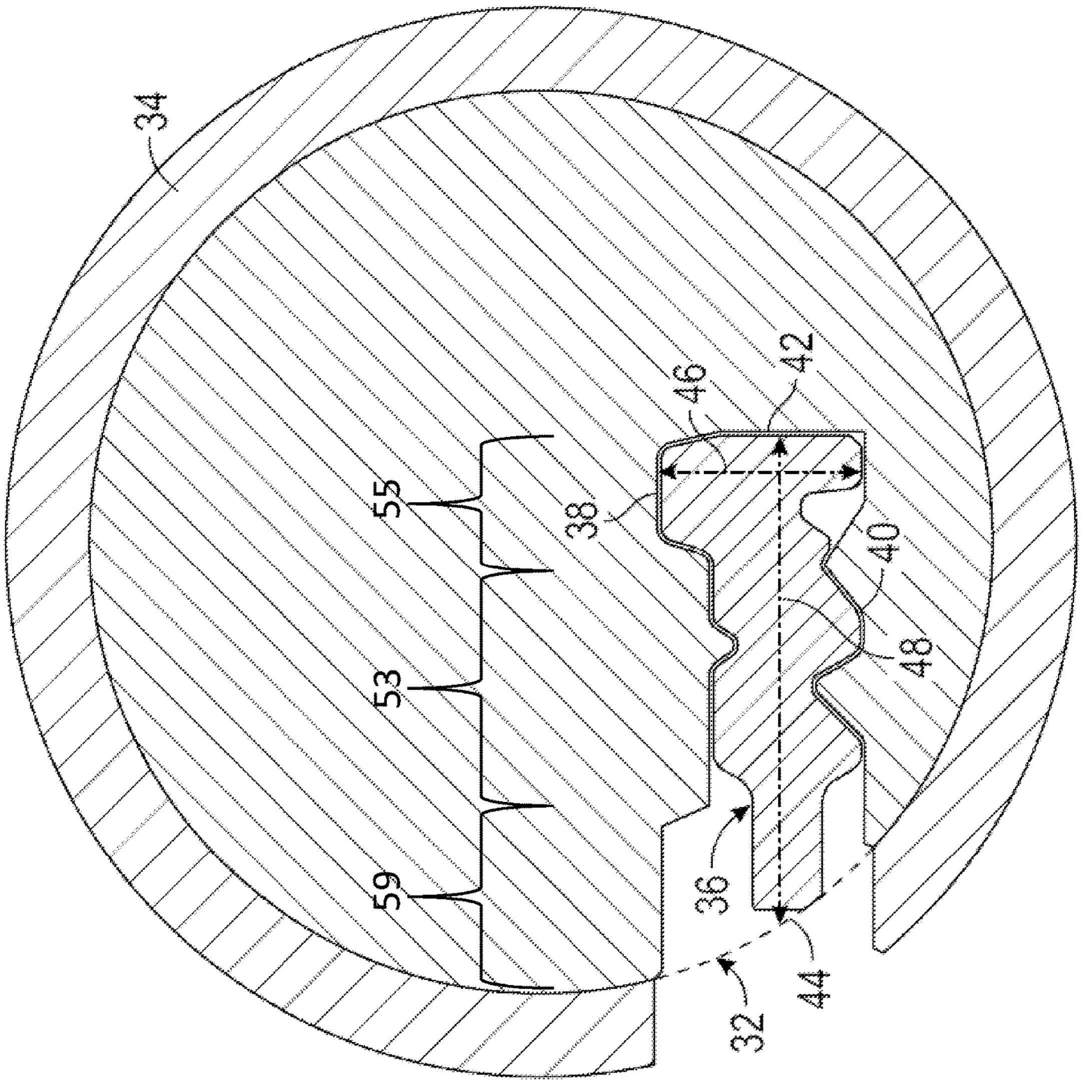
FIG. 2 is transverse cross-sectional view of a key and keyway of a lock with a horizontally-oriented keyway.

FIG. 1 shows a lock 4 and key 6 in cross-section. Lock 4 has an outer housing with a cylinder or plug rotatably housed within the housing and a vertically-oriented, axially extending keyway 2 formed in the cylinder. Similarly, FIG. 2 shows a lock 34 and key 36 in cross-section. Lock 34 has an outer housing with a cylinder or plug rotatably housed within the housing and a horizontally-oriented, axially extending keyway 32 formed in the cylinder. Referring to FIG. 1, the vertically-oriented keyway 2 has a top edge 8, an open bottom 10, and first 12 and second 14 opposed sides. The overall height 16 of the keyway is the distance from the top edge 8 to the open bottom 10 while the overall width 18 of the keyway 2 is the distance between first side 12 and second side 14, which, as can be seen in FIG. 1, may vary along the height of the keyway 2. In the vertically-oriented keyway 2, the height 16 of the keyway is greater than the maximum width 18 of the keyway. The key 6 for the vertically-oriented keyway 2 generally corresponds in shape (contour) to the vertically-oriented keyway 2 and has a height 16 greater than its maximum width 18. For convenience, the reference numbers used for the height 16 and width 18 of the key 6 are the same as the reference numbers used for the height 16 and width 18 of the vertically-oriented keyway 2. Notwithstanding, it will be appreciated by a person having ordinary skill in the art (POSA) that the height and width of the key 6 need to be smaller than the height and width of the keyway 2 in which the key 6 is to be inserted.

Referring to FIG. 2, the horizontally-oriented keyway 32 has a top surface 38, a bottom surface 40, a first edge 42, and second, open edge 44. The overall width 48 of the keyway 32 is the distance between the first edge 42 and second edge 44. The overall height 46 of the keyway is the distance between the top surface 38 and the bottom surface 40, which, as can be seen in FIG. 2, may vary along the width of the keyway 32. In the horizontally-oriented keyway 32, the width 48 of the keyway is greater than the maximum height 46 of the keyway. The key 36 for the horizontally-oriented keyway 32 generally corresponds in shape (contour) to the horizontal keyway 32 and has a width 48 greater than its maximum height 46. For convenience, the reference numbers used for the height 46 and width 48 of the key 36 are the same as the reference numbers used for the height 46 and width 48 of the horizontally-oriented keyway 32. Notwithstanding, it will be appreciated by a POSA that the height and width of the key 36 need to be smaller than the height and width of the keyway 32 in which the key 36 is to be inserted.

As shown in FIG. 1, first side 12 and second side 14 of keyway 2 include various profile features conforming to ridges, plateaus, and grooves formed in key 6. Similarly, as shown in FIG. 2, top surface 38 and bottom surface 40 of horizontally oriented keyway 32 includes various profile features conforming to ridges, plateaus, and grooves formed in key 36.

As used herein, a vertical lock, or vertical cylinder lock, refers to a lock with a vertically-oriented keyway (or, more generally, to a lock in which the long axis of the transverse keyway cross-section is oriented parallel to the axes of the tumbler pins, which may or may not be vertically-oriented, so that the tumbler pins contact an edge of the key blade inserted into the keyway), and a vertical key refers to a key configured to operate the vertical lock. Vertical tumbler pins or vertical pins refer to the tumbler pins (and, specifically, the tumbler pin orientation) of a vertical lock which, as explained above, may not actually be vertical. A horizontal lock, or horizontal cylinder lock, refers to a lock with a horizontally-oriented keyway (or, more generally, to a lock in which the long axis of the transverse keyway cross-section is oriented perpendicular to the axes of the tumbler pins, which may or may not be horizontally-oriented, so that the tumbler pins contact a side of the key blade inserted into the keyway), and a horizontal key refers to a key configured to operate a horizontal lock. Horizontal tumbler pins or horizontal pins refer to the tumbler pins (and, specifically, the tumbler pin orientation) of a horizontal lock which, as explained above, may not actually be horizontal.

Figures 3A, 3B, 3C:
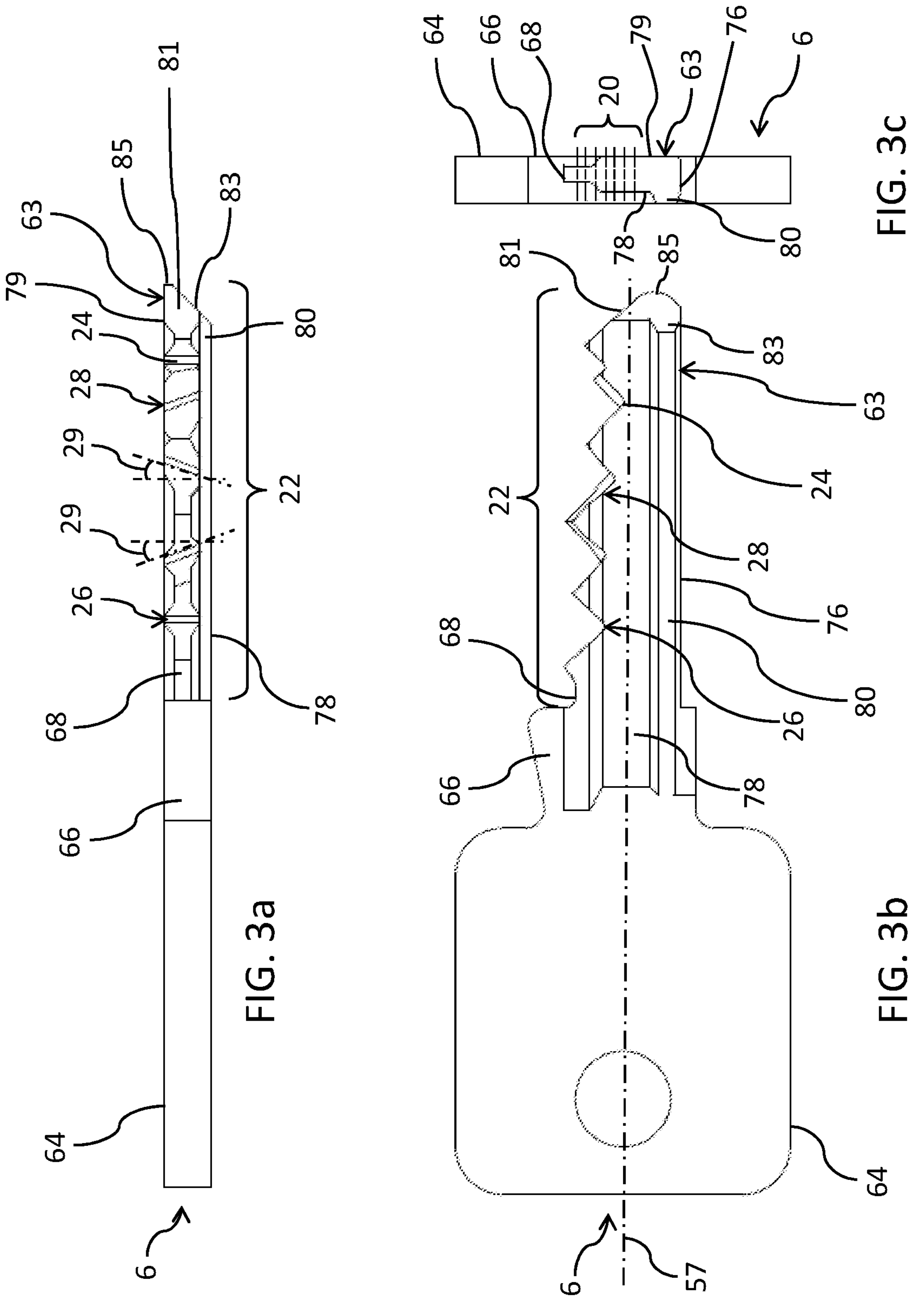
FIGS. 3*a*-3*c* are a top view, side view, and end view, respectively, of the key with bittings for the lock with a vertically-oriented keyway.
Figures 4A, 4B, 4C:
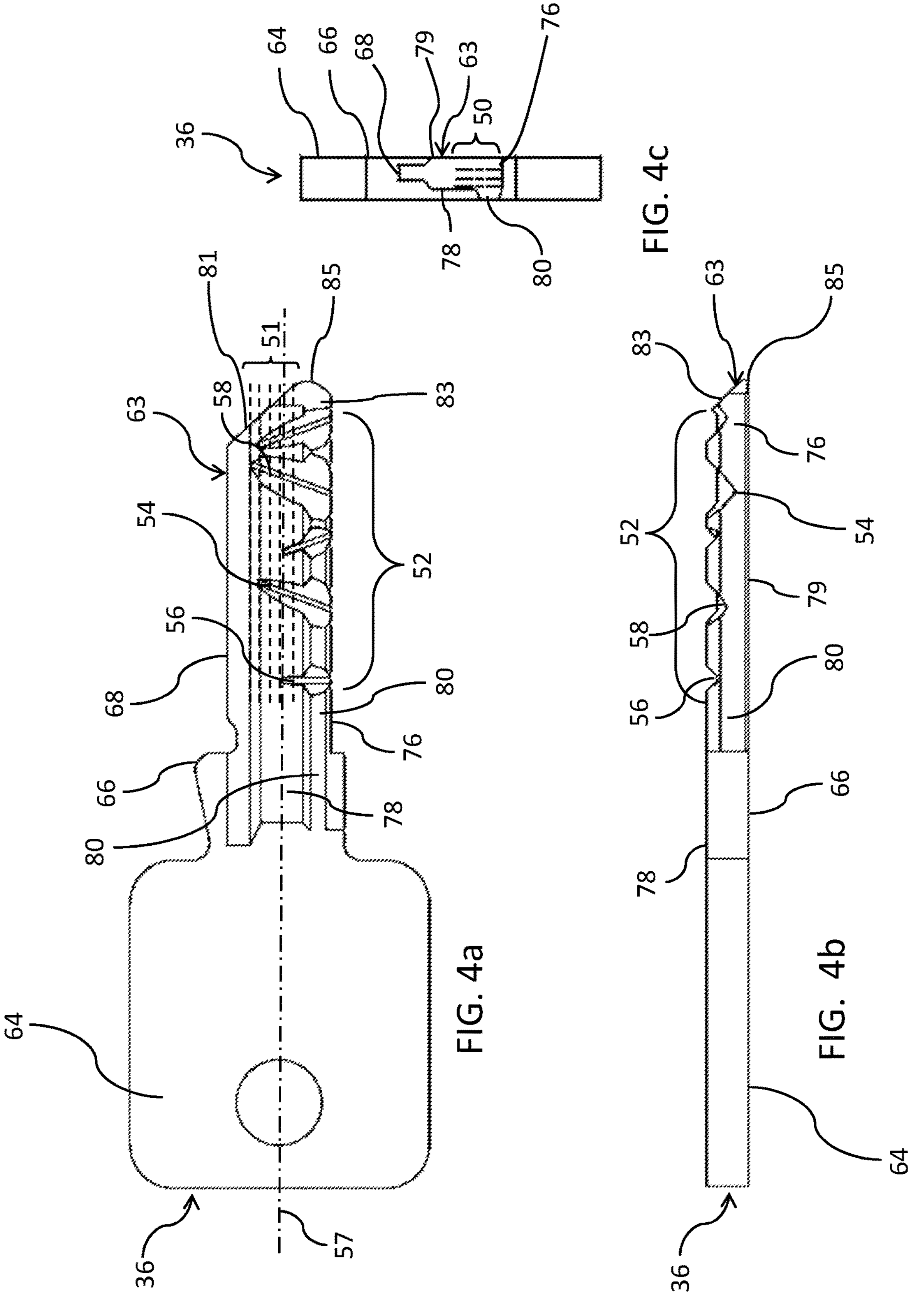
FIGS. 4*a*-4*c* are a side view, bottom view, and end view, respectively, of the key with bittings for the lock with a horizontally-oriented keyway.
Figure 5:
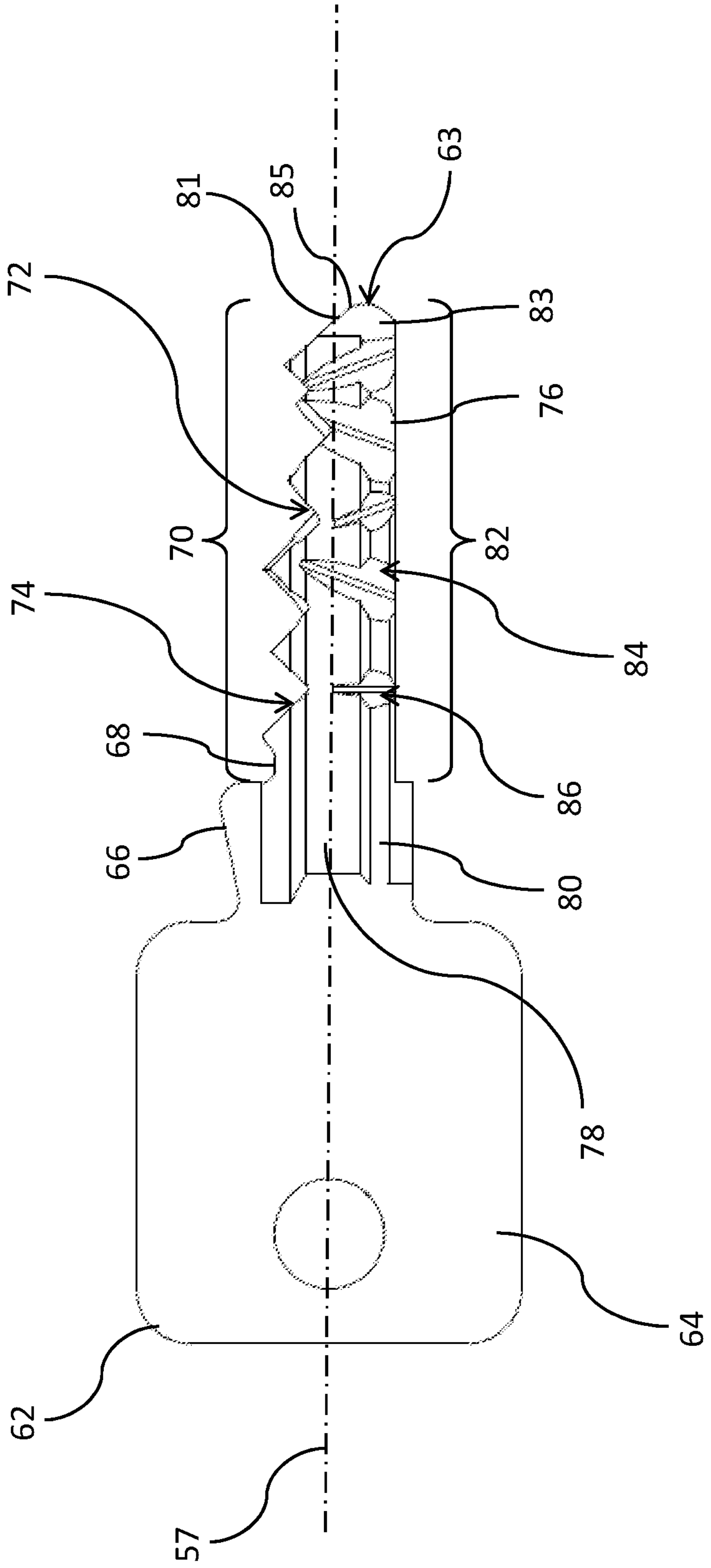
FIG. 5 is a side view of a key with bittings for a lock with a vertically-oriented keyway and bittings for a lock with a horizontally-oriented keyway.

FIGS. 3*a*-3*c*, show an embodiment of a vertical key, or key 6 configured to operate vertical lock 4 (FIG. 1). FIGS. 4*a*-4*c* show an embodiment of a horizontal key, or key 36 configured to operate horizontal lock 34 (FIG. 2). FIG. 5 shows an embodiment of a key 62 configured to operate both vertical lock 4 and horizontal lock 34.

In an embodiment, each key 6, 36, 62 includes a bow 64 and a shoulder or key stop 66, with a blade 63 extending from the key stop 66 to a distal end 85 of the blade 63. Each key 6, 36, 62 includes a primary top, or first, edge 68 having formed therein, or configured to have formed therein, bitting cuts for operating a vertical lock, a bottom, or second, edge 76, a first side 78 having formed therein, or configured to have formed therein, bitting cuts for operating a horizontal lock, and an opposed second side 79. The first side 78 includes a longitudinal rib 80 extending along some or all of the length of the blade 63. The top edge 68, bottom edge 76, first side 78, and second side 79 define a cross-sectional shape of the key blade 63. In some embodiments, rib 80 is formed along a bottom end of first side 78 so that key blade 63 has a generally “L”-shaped cross section (which may be a backwards “L” in some embodiments). Each side may further include warding grooves and ridges as further discussed below (see FIGS. 6-13). Note that the designation of sides as first and second is arbitrary.

Referring to FIGS. 3*a*-3*c*, the key 6 has edge bittings 22 (also referred to as vertical bittings), which are “V”-shaped bittings formed (e.g., cut, machined, ground, stamped, etc.) into primary top edge 68 of the key 6 to operate vertical lock 4. In an embodiment, edge bittings 22 have angled or beveled surfaces that are configured to elevate and rotate tumbler pins of the vertical lock as is known in the art. See e.g. U.S. Pat. No. 3,499,302.

The edge bittings 22 are cut into the top edge 68 through at least a portion of the blade height towards the bottom edge. The edge bittings 22 may extend to various depths relative to the top edge 68, for example, as indicated by the dimension lines 20 shown in FIG. 3*c*. A thalweg or base or root 24 is the lowest portion of each “V” cut, and dimension lines 20 represent the depths or potential depths of the bases 24 of the edge bittings 22. In one embodiment, the depth 20 of the base extends no further than two-thirds of the dimension of the unbitted key blade 63 from the top edge 68 to the bottom edge 76 (which dimension may be referred to as the height of the key blade). A perpendicular top edge cut 26 is a “V” cut with a base 24 cut perpendicular to the length, or longitudinal axis 57, of the key blade 63 (i.e., parallel to the width of the key blade 63). Skewed top edge cut 28 is a “V” cut with a base 24 oriented at an angle relative to the base 24 of the perpendicular cut 26 and not perpendicular to the longitudinal axis 57 of the key blade. Skewed cuts can increase the number of unique key possibilities and allow increased security features to be included on the tumbler pins, for example notches that require the pin to be rotated to align with a sidebar. See e.g. U.S. Pat. No. 3,499,302.

The process of cutting skew cut bittings, however, may produce bitting peaks with interfering vertices as described in more detail below.

In various embodiments, the skewed top edge cuts 28 are oriented at an angle 29 no greater than 20° clockwise or counterclockwise relative to the perpendicular cut 26 (i.e., about 70°-110° relative to the length, or longitudinal axis 57, of the blade 63). In various embodiments, the key 6 may include only skewed top edge cuts 28 or a combination of skewed top edge cuts 28 with one or more perpendicular top edge cuts 26.

The blade 63 may further include an edge bevel 81 extending from the distal end 85 of the blade 63 to the top edge 68 of the blade 63. As the key blade 63 is inserted into the vertically-oriented keyway 2 of the vertical lock 4, the edge bevel 81 guides the tumbler pins of the vertical lock to the top edge 68 of the key blade 63.

Referring to FIGS. 4*a*-4*c*, the key 36 has side bittings 52 (also referred to as horizontal bittings), which are “V”-shaped bittings formed (e.g., cut, machined, ground, stamped, etc.) into a first side 78 of the key 36 to operate horizontal lock 34. The side bittings 52 are configured to elevate and rotate tumbler pins of the horizontal lock having angled or beveled ends (not shown in the figures).

The side bittings 52 are cut into the rib 80 (e.g., into the short leg of the “L”-shaped cross section) and partially into a portion of the first side 78 of the blade 63 above the rib 80 and extend across and through at least a portion of the blade 63 from the bottom edge 76 toward the top edge 68. One or more of the side bitting 52 extend toward top edge 68 past a longitudinal axis 57 of the blade 63. The bittings are cut into a portion of the thickness of the blade 63 so as to have a depth extending from the first side 78 towards the second side 79 of the blade 63. The side bittings 52 may be cut into the thickness of the blade to various depths relative to the first side 78, for example as shown by dimension lines 50 in FIG. 4*c*. In some embodiments, the side bittings 52 do not extend to a depth more than half of the thickness of the key blade 63. Additionally, the side bittings 52 may extend to various heights from the bottom edge 76 toward the top edge 68, for example as shown by dimension lines 51 in FIG. 4*a*. As the side bitting cuts are essentially flat, the height that a cut extends from the bottom edge 76 corresponds to the depth of the cut. The deeper the cut, the higher the cut extends from the bottom edge 76 of the blade 63.

A thalweg or base or root 54 is the lowest portion of each “V” cut. A perpendicular side cut 56 is a “V” cut with a base 54 cut perpendicular to the length, or longitudinal axis 57, of the key blade 63 (i.e., parallel to the height of the key blade 63). A skewed side cut 58 is a “V” cut with a base 54 oriented at an angle relative to the horizontal perpendicular cut 56 and not perpendicular to the longitudinal axis 57 of the key blade. In various embodiments, the skewed side cut 58 is oriented at an angle no greater than 20° clockwise or counterclockwise relative to the horizontal perpendicular cut 56 (i.e., about 70°-110° relative to the length, or longitudinal axis 57, of the blade). In various embodiments, the key 36 may include only skewed side cuts 58 or a combination of skewed side cuts 58 with one or more perpendicular side cuts 56.

The blade 63 may further include a side bevel 83 extending from the distal end 85 of the blade 63 to the first side surface 78 of the blade 63. As the key blade 63 is inserted into the horizontally-oriented keyway 32 of the horizontal lock 34, the side bevel 83 guides the tumbler pins of the horizontal lock 34 to the first side surface 78 of the key blade 63.

In some embodiment, key 6 and key 36 have the same cross-sectional profile, and both keys 6 and 36 can be inserted into keyway 2 and both keys 6 and 36 can be inserted into keyway 32.

As shown in FIG. 5, embodiments of the disclosure have both edge bitting cuts 70 for operating a vertical lock and side bitting cuts 82 for operating a horizontal lock. One or more of the edge bitting cuts 70 may be vertical skewed cuts 72, and one or more of the side bitting cuts 82 may be horizontal skewed cuts 84. In various embodiments, the key blade 63 may have one or more vertical perpendicular cuts 74 and one or more horizontal perpendicular cuts 86. The blade 63 may further include an edge bevel 81 and/or a side bevel 83.

Figure 6:
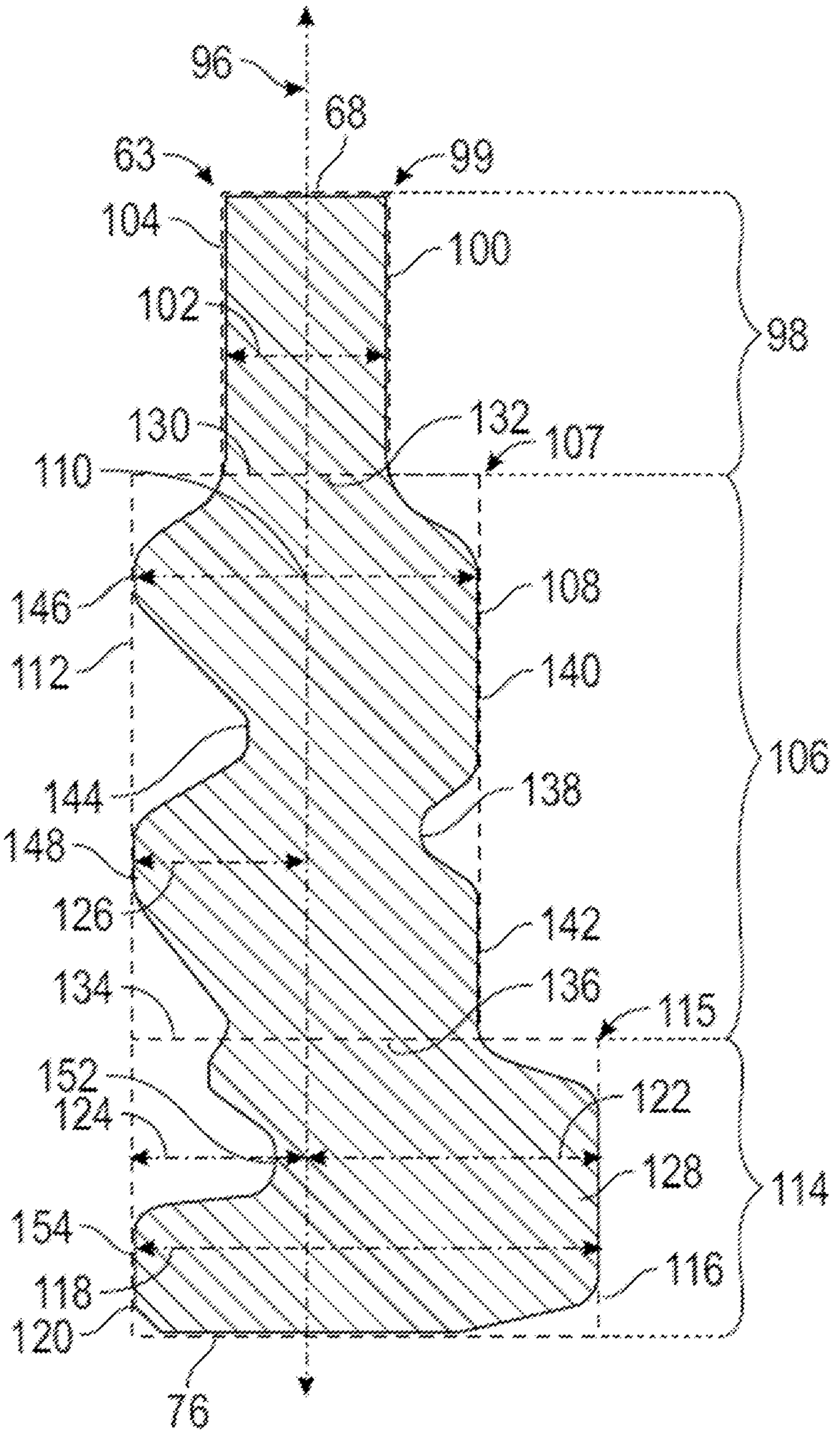
FIG. 6 is transverse cross-sectional view of a key blade.

FIG. 6 depicts a cross-sectional shape of an embodiment of the blade 63 of a key blank configured to receive edge bitting cuts and/or side bitting cuts so that a key formed from the blank may be operable in a vertical and/or a horizontal lock, as applicable. The cross-sectional shape of the blade 63 includes three distinct segments 98, 106, 114 between the top edge 68 and the bottom edge 76.

First segment 98 is encompassed by a rectangular envelope 99 defined by top edge 68 (corresponding with the top edge 68 of the blade 63), a first side boundary 100, a second side boundary 104, and a lower boundary 130. First side boundary 100 and second side boundary 104 correspond to physical side surfaces of blade 63 within segment 98, but lower boundary 130 is not a physical edge of the blade 63 but represents a boundary between first segment 98 and second segment 106. The top edge 68 is configured to receive edge bitting cuts as described above. First side boundary 100 and second side boundary 104 of the first segment 98 have a first thickness 102 therebetween, with the first side boundary 100 and the second side boundary 104 equidistant from a centerline 96 extending through the blade from the top edge 68 to the bottom edge 76. The side boundaries 100, 104 of envelope 99 correspond to portions of the segment 98 furthest distant from the centerline 96. In the illustrated embodiment, side boundaries 100, 104 of envelope 99 correspond to opposed, parallel sides of the blade 63 within segment 98. Lower boundary 130 of the envelope 99 is defined as the point at which the opposed sides of the blade 63 are no longer parallel and begin to flare outwardly from the centerline 96.

First segment 98 may or may not include warding grooves and/or ridges.

Second segment 106 is encompassed by a rectangular envelope 107 defined by upper boundary 132 (corresponding to lower boundary 130 of envelope 99), a first side boundary 108, a second side boundary 112, and a lower boundary 134. Upper boundary 132 and lower boundary 134 are not physical edges of the blade 63, but represent boundaries between first segment 98 and second segment 106 and between second segment 106 and third segment 114, respectively. The second segment 106 may be further characterized by various warding features that fall within the envelope 107. The side boundaries 108, 112 of envelope 107 correspond to portions of the segment 106 furthest distant from the centerline 96. In the illustrated embodiment, FIG. 6 depicts the right side of segment 106 having a groove 138 between two peaks, or plateaus, 140, 142 and the left side of segment 106 having a groove 144 between two ridges defining peaks 146, 148. First side boundary 108 of envelope 107 corresponds to the peaks 140, 142, being equal and maximum distances from the centerline 96. Second side boundary 112 of envelope 107 corresponds to the peaks 146, 148, being equal and maximum distances from the centerline 96. First side boundary 108 and second side boundary 112 are equal distant from the centerline 96, and the maximum width 110 of segment 106 is defined as the distance from first side boundary 108 to second side boundary 112, or the distance from peak 140 or 142 to peak 146 or 148.

Maximum width 110 of segment 106 (envelope 107) is greater than maximum width 102 of segment 98 (envelope 99).

Lower boundary 134 of the envelope 107 is defined as the point at which the right side of the blade 63 begins to flare outwardly from the centerline 96 and is no longer equidistant from centerline 96 as second side boundary 112 of envelope 107.

The third segment 114 is encompassed by a rectangular envelope 115 defined by an upper boundary 136 (corresponding to lower boundary 134 of envelope 107), a first side boundary 116, a second side boundary 120, and the bottom edge 76. Upper boundary 136 is not a physical edge of blade 63, but represents a boundary between second segment 106 and third segment 114. Third segment 114 includes a longitudinal rib 128 within the envelope 115 and is configured to receive side bitting cuts that may extend from bottom edge 76 into the right-hand side of segment 106.

The side boundaries 116, 120 of envelope 115 correspond to portions of the segment 114 furthest distant from the centerline 96. In the illustrated embodiment, FIG. 6 depicts the right side of segment 114 having longitudinal rib 128 and the left side of segment 114 having a groove, or undercut, 152 and a lobe 154. First side boundary 116 of envelope 115 corresponds to the outer edge of rib 128 (i.e., portion furthest from centerline 96), and second side boundary 120 of envelope 115 corresponds to the outer edge of lobe 154 (i.e., portion furthest from centerline 96). The maximum width 118 of segment 114 is defined as the distance from first side boundary 116 to second side boundary 120, or the distance from rib 128 to lobe 154.

In some embodiments, the maximum thickness 118 of segment 114 is greater than the maximum thickness 102 of segment 98 and the maximum thickness 110 of segment 106, and the first side boundary 116 and second side boundary 120 are not equidistant from the centerline 96. Rather, a distance 122 between the centerline 96 and the first side boundary 116 of the envelope 115 is greater than a distance 124 from the centerline 96 to the second side boundary 120 of envelope 115. The distance 124 between the centerline 96 and the second side boundary 120 of envelope 115 is equal to a distance 126 between the centerline 96 and the second side boundary 112 of envelope 107, so that the second side boundary 120 of envelope 115 is coplanar with the second side boundary 112 of envelope 107. Thus, while first segment 98 and second segment 106 are symmetric with respect to centerline 96, third segment 114 is asymmetric with respect to centerline 96.

In an embodiment, edge bittings 22, 70 for operating tumbler pins of a cylinder lock with a vertically-oriented keyway (as in FIG. 1) may be formed in top edge 68 of blade 98 in the portion corresponding to first segment 98, Side bitting 52, 82 for operating tumbler pins of a cylinder lock with a horizontally-oriented keyway (as in FIG. 2) may be formed in segment 114, and may extend into segment 106, and may be formed on the thicker side of segment 114 corresponding to thickness 122.

In various, non-limiting embodiments, to maintain a sufficient strength in the key 62 having both edge bittings 70 and side bittings 82, the thickness 102 of first segment 98 (envelope 99) is about 0.060 inch, the thickness 110 of the second segment 106 (envelope 107) is about 0.093 inch, and the thickness 118 of third segment 114 (envelope 115) is about 0.125 inch.

A POSA would understand that the various warding segments may have various shapes, sizes/proportions, quantities, angles, and other configurations.

Returning to FIG. 1, vertically-oriented keyway 2 may be divided into three segments 45, 47, 49 of relative widths and symmetry corresponding to segments 98, 106, 114, respectively, of key blade 63. Returning to FIG. 2, horizontally-oriented keyway 32 may be divided into three segments, with two segments 53, 55 of relative widths and symmetry corresponding to second and third segments 106, 114, respectively, of key blade 36.

As noted above, the process of cutting skew cut bittings on the top edge and on the side edge or rib produces bitting peaks with vertices that can interfere with the rotation of tumbler pins of a lock as the key blade is inserted into the keyway. The interference of the vertices can be minimized by carefully designing the warding shapes, bitting angles, and bitting depths as further described below.

Figure 7:
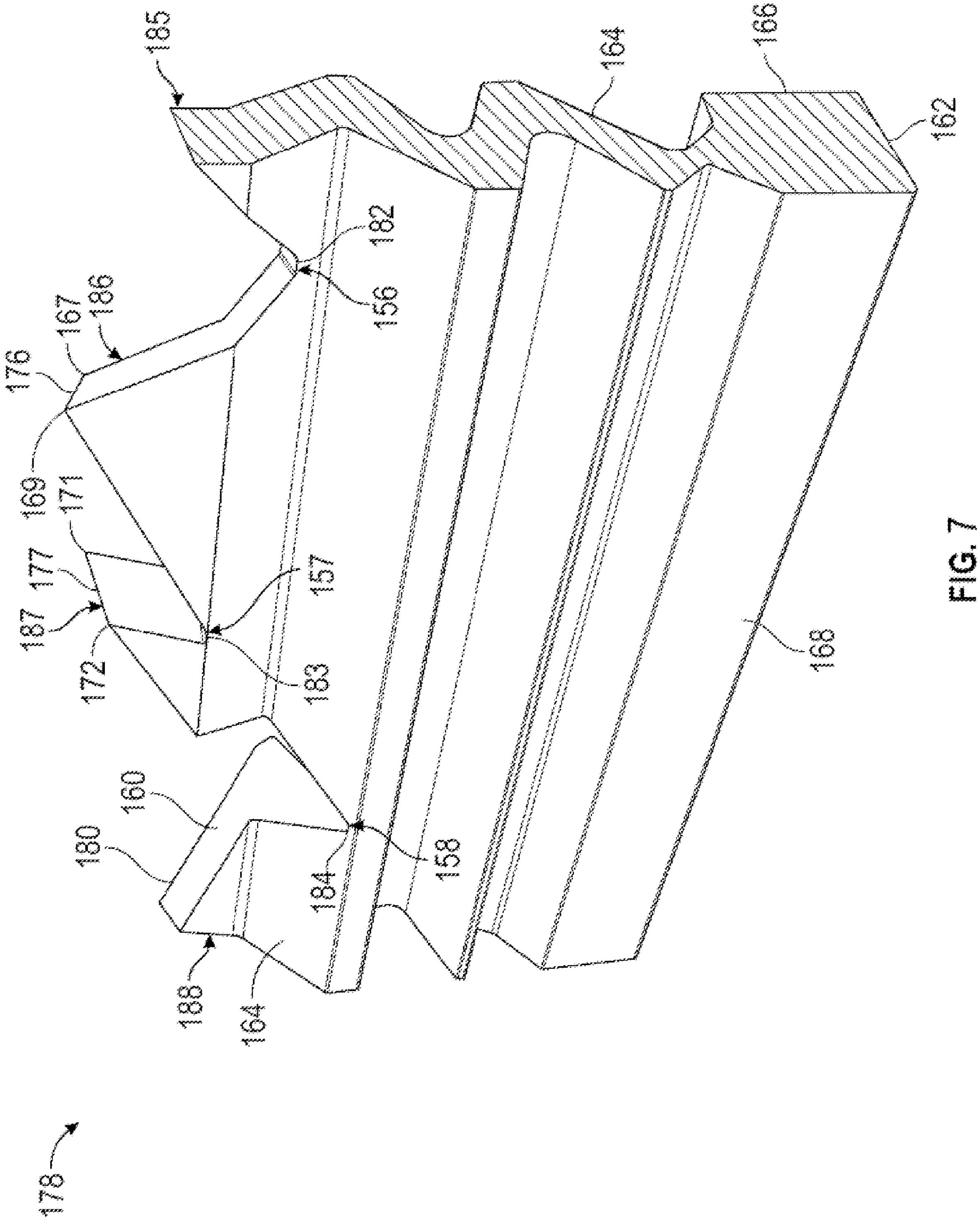
FIG. 7 is a partial, perspective view of a key blade segment with angled warding surfaces.
Figure 8:
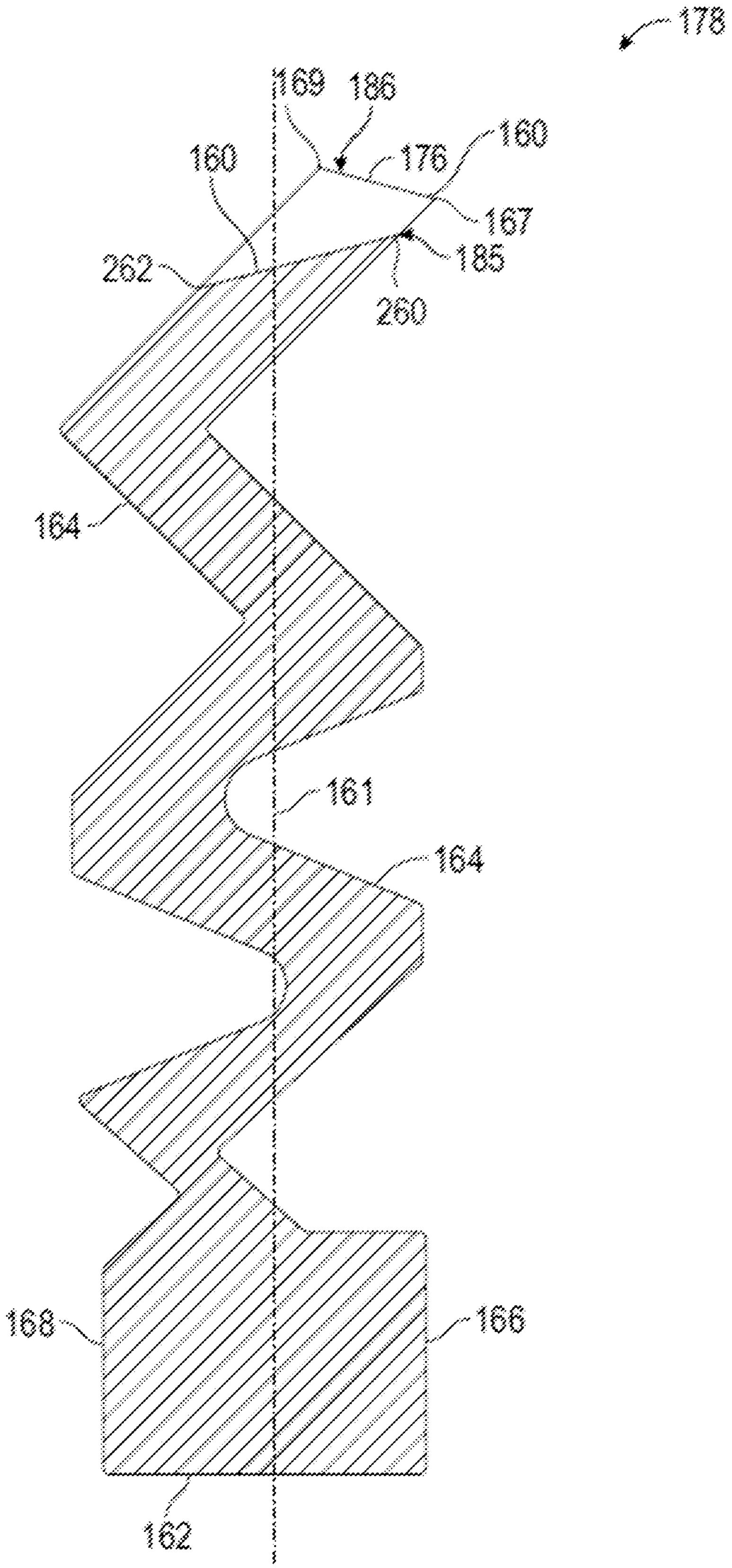
FIG. 8 is an end view of the key blade segment of FIG. 7.

FIGS. 7 and 8 depict a key blade segment 178 for a vertical cylinder lock having a top edge 160, bottom edge 162, first side 166, and opposing second side 168, with angled warding surfaces 164 on the first side 166 and second side 168 of the key blade segment 178 and forming angled longitudinal warding grooves. The angled warding surfaces 164 are oriented at acute angles relative to an axis 161 perpendicular to the bottom edge 162, extending through the centroid of the key blade segment 178, and connecting the top edge 160 and the bottom edge 162, as shown in FIG. 8.

Referring to FIG. 7. "V"-shaped vertical bittings forming the top edge 160 of the key blade segment 178 include alternating peaks 185, 186, 187, 188 and valleys 156, 157, 158. Each valley 156, 157, 158 defines a thalweg or base 182, 183, 184. Valleys formed in the vertical bittings, such as valleys 156, 157, 158, may have the same or varying depths and slopes (angles of the opposed sides of the valley). The depth of valleys 156, 157, 158 is related to the height of the adjacent peak 185, 186, 187, 188 and the angle of the slopes of the valleys 156, 157, 158. A deeper valley will result in a shorter peak (i.e., a peak positioned closer to the bottom edge 162) if the slope connecting the valley to the peak remains unchanged. Alternatively, a deeper valley with a steeper (i.e., more vertical) slope causes the height of the adjacent peak to remain unchanged. In various embodiments, however, the maximum depth of any valley should be such that the remaining material under the cut (i.e., the material between the thalweg, or base, of the valley and the bottom edge 162 of the key blade) is not less than one-third of the height of the original, unbitted key blank blade.

The "V"-shaped valleys 156, 157, 158 of the vertical bittings may be cut in an unskewed orientation (i.e., perpendicular to a longitudinal axis of the blade) or at a skewed orientation (i.e., at a non-perpendicular angle with respect to the longitudinal axis of the blade). Details of a bitting peak are described with reference to peak 186 and peak 187. Peak 186 is defined by a first vertex 167 on the first side 166 of the key blade segment 178 and a second vertex 169 on the second side 168 of the key blade segment 178 with a top lateral edge 176 extending between the first vertex 167 and the second vertex 169. Peak 187 is defined by a first vertex 171 on the first side 166 of the key blade segment 178 and a second vertex 172 on the second side 168 of the key blade segment 178 with a top lateral edge 177 extending between the first vertex 171 and the second vertex 172. Differential skew angles of the adjacent valleys 156 and 157 forming peak 186 (i.e., the skew angle of valley 156 with respect to the longitudinal axis of the blade as compared to the skew angle of valley 157 with respect to the longitudinal axis of the blade) result in a vertical offset between the first vertex 167 and the second vertex 169, and differential skew angles of the adjacent valleys 157 and 158 forming peak 187 result in a vertical offset between the first vertex 171 and the second vertex 172. That is, because the skew angle of valley 156 with respect to the longitudinal axis of the blade is different from the skew angle of valley 157 with respect to the longitudinal axis of the blade, a vertical offset is created between first vertex 167 and the second vertex 169. On the other hand, if the skew angle of valley 156 with respect to the longitudinal axis of the blade is the same as the skew angle of valley 157 with respect to the longitudinal axis of the blade, no vertical offset would be created between first vertex 167 and the second vertex 169. Similarly, because the skew angle of valley 157 with respect to the longitudinal axis of the blade is different from the skew angle of valley 158 with respect to the longitudinal axis of the blade, a vertical offset is created between first vertex 171 and the second vertex 172. If the skew angle of valley 157 with respect to the longitudinal axis of the blade were the same as the skew angle of valley 158 with respect to the longitudinal axis of the blade, no vertical offset would be created between first vertex 171 and the second vertex 172. This is further illustrated in FIGS. 9-10 as described below.

Referring to FIG. 7, the positions of vertex 167 and vertex 169 along the key blade segment 178 is governed by the nature of the warding surfaces 164, the depth of adjacent valleys 156, 157, the slopes of the "V" cuts (e.g., the cuts of valley 156 and valley 157), and the skew angles of valleys 156 and 157. As described above, the skew angles of valleys 156 and 157 impact the vertical offset between vertex 167 and the vertex 169. Similarly, the positions of first vertex 171 and second vertex 172 along the key blade segment 178 is governed by the nature of the warding surfaces 164, the depth of adjacent valleys 157, 158, the slope of the "V" cuts (e.g., the cuts of valley 157 and valley 158), and skew angle of valleys 157 and 158 (creating an offset between first vertex 171 and second vertex 172). For example, modifying valley 156 to extend deeper (i.e., closer to the bottom edge 162 of the key blade 178) while maintaining the same slope of the "V" cut of valley 156 will reduce the height of peak 186 and reposition vertex 169, top lateral edge 176, and vertex 167 to a lower position (i.e., closer to the bottom edge 162) and closer to peak 187.

To further illustrate the effect of the depth of the valley, the nature of the warding surface, the slope of the "V" cuts, and the skew angles of the valleys, FIG. 8 depicts lateral edge 176 of peak 186 having vertex 167 and vertex 169, and lateral edge 160 of peak 185 having vertex 260 and vertex 262. Axis 161 represents the approximate center line of the key blade segment 178 which is also the general path that a tumbler pin of a lock (not shown) would pass over when the key blade 178 is inserted into the lock (i.e., vertical pin axis). Vertices 167, 169, 260, and 262 are each positioned in a different location (height) relative to the bottom edge 162 of the key blade segment 178 and the vertical pin axis 161. Vertex 167 and vertex 169 are positioned at a higher or a further distance from bottom edge 162 than vertex 260 and vertex 262 because peak 186 is higher, or at a further distance from bottom edge 162, than peak 185. Vertex 167 and vertex 169 are positioned to the right of vertical pin axis 161 because the warding surface 164 at the height of peak 186 extends to the right of vertical pin axis 161. Due to the warding shape at the height of peak 185, vertex 262 is positioned to the left of vertical pin axis 161 and vertex 260 is positioned to the right of vertical pin axis 161 at a distance greater than vertex 169 but less than vertex 167. When blade 178 is inserted into a lock having tumbler pins, the pins are more likely to become caught on vertex 169 or vertex 262 because vertex 169 and vertex 262 are closer to the pathway of the tumbler pin than vertex 167 or vertex 260.

Figure 9:
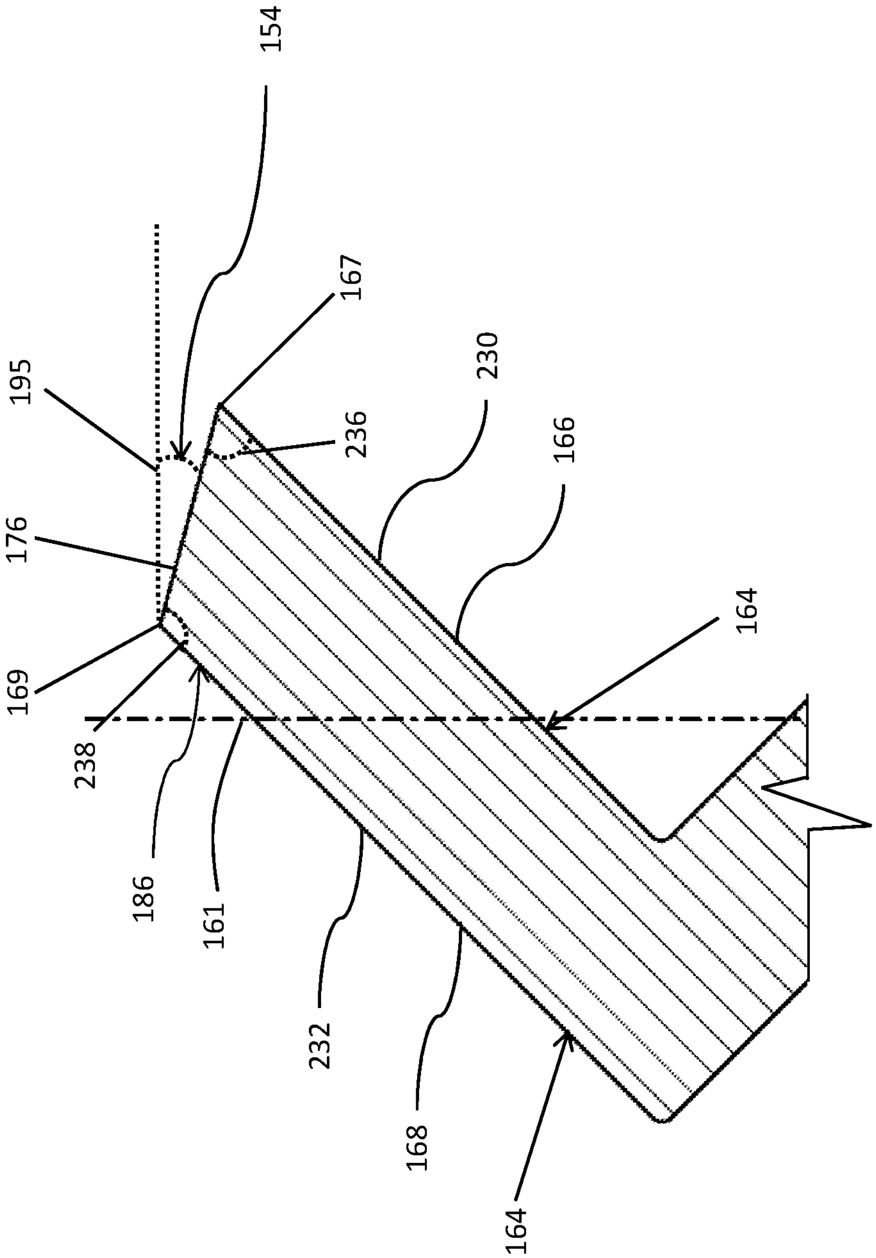
FIG. 9 is a partial transverse cross-sectional view of one peak of the key blade segment of FIG. 7.

FIG. 9 is a partial cross-sectional view of peak 186 through and parallel to top lateral edge 176 (i.e., the cross section is not perpendicular to the longitudinal axis of the blade). Peak 186 has a first side 230 and second side 232. As shown in FIG. 9, vertex 167 on the first side 230 of peak 186 is offset at a lower position (relative to horizontal) than vertex 169 on the second side 232 of peak 186 so that top lateral edge 176 is tilted in a clockwise direction by an angle 154 between the top lateral edge 176 and an axis 195 parallel to the bottom edge 162 (horizontal in FIG. 9). Side 230 corresponds to the angled warding surface 164 on the first side 166 of the key blade segment, and side 232 corresponds to the angled warding surface 164 on the second side 168 of the key blade segment. Side 230 extends inward relative to vertex 167 (i.e., beneath vertex 167) and top lateral edge 176, thereby forming a first vertex angle 236 between top lateral edge 176 and side 230. Side 232 extends outward and away from vertex 169 and top lateral edge 176, thereby forming a second vertex angle 238 between top lateral edge 176 and side 232. Vertex angle 236 and vertex angle 238 vary in degree based on the shape of the warding surfaces 164 and the angle 154 of the top lateral edge 176, which in turn is determined by the differential skew angles forming valleys 156 and 157 as described above. Side 230, angled inward relative to vertex 167, forms a vertex angle 236 that is smaller than vertex angle 238, whereas side 232 is angled outward relative to vertex 169. Thus, the key segment has a more severe "point" at vertex 167 than at vertex 169. Vertex 169 is positioned closer to the path of a tumbler pin, (i.e., closer to vertical pin axis 161) when the key is inserted into a lock (not shown) than vertex 167 and is more likely to contact the tumbler pin. However, since side 232 extends outward and vertex angle 238 is less acute, the tumbler pin is less likely to become caught on vertex 169. If the tumbler pin contacts vertex 167, the pin is more likely to become caught on vertex 167 than vertex 169 because vertex angle 236 is more acute than vertex angle 238, and side 230 extends inwardly relative to vertex 167 and top lateral edge 176 rather than outwardly. Thus, the angle and orientation of warding surface 164 on second side 232 results a less acute, or even obtuse, angle 238 at vertex 169, so that a tumbler pin, which has greater contact with vertex 169 than vertex 167, is less likely to get caught on vertex 169.

Figure 10:
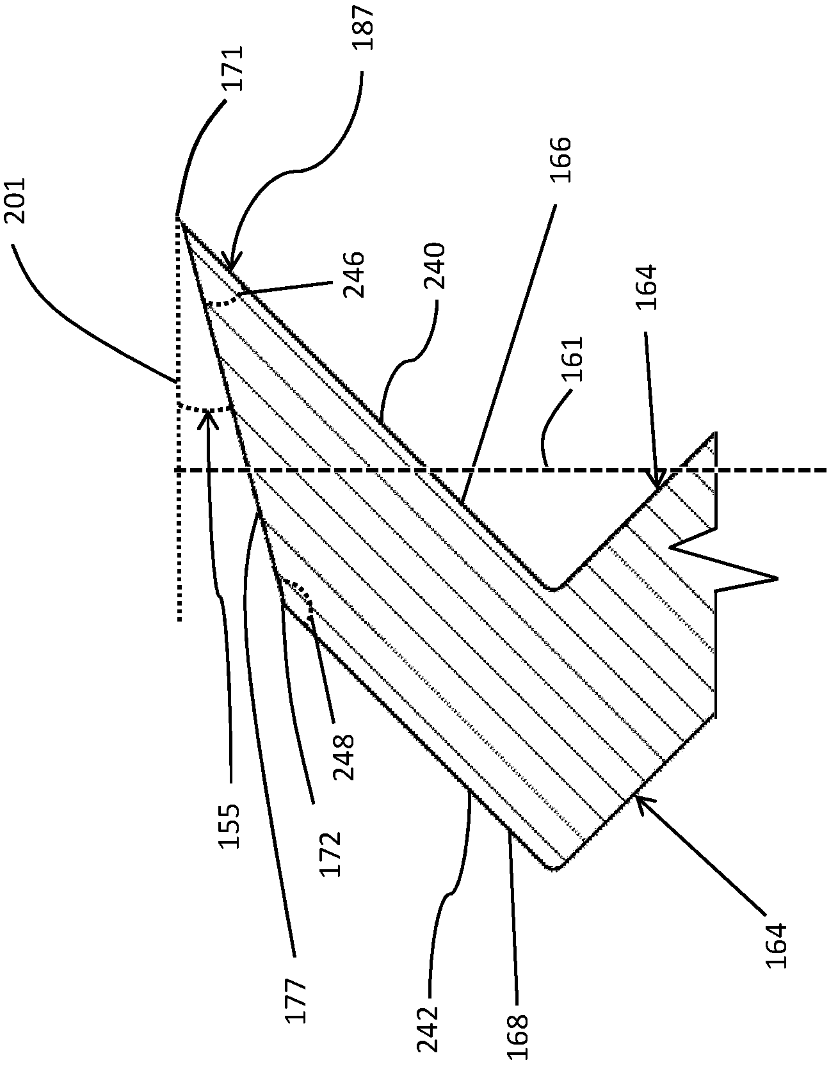
FIG. 10 is a partial transverse cross-sectional view of one peak of the key blade segment of FIG. 7.

FIG. 10 is a partial cross-sectional view of peak 187 through and parallel to top lateral edge 177 (i.e., the cross section is not perpendicular to the longitudinal axis of the blade). Peak 187 has a first side 240 and a second side 242. As shown in FIG. 10, first vertex 171 on the first side 240 of peak 187 is offset at a higher position (relative to horizontal) than second vertex 172 on the second side 242 of peak 187 so that top lateral edge 177 is tilted in a counter-clockwise direction by an angle 155 between the top lateral edge 177 and an axis 201 parallel to the bottom edge 162 (horizontal in FIG. 10). Side 240 corresponds to the angled warding surface 164 on the first side 166 of the key blade segment, and side 242 corresponds to the angled warding surface 164 on the second side 168 of the key blade segment. Side 240 extends inward relative to first vertex 171 and top lateral edge 177, thereby forming a first vertex angle 246 between top lateral edge 177 and side 240. Side 242 extends outward and away from second vertex 172 and top lateral edge 177, thereby forming a second vertex angle 248 between top lateral edge 177 and side 242. First vertex angle 246 and second vertex angle 248 vary in degree based on the shape of the warding surfaces 164 and the angle 155 of the top lateral edge 177, which in turn is determined by the differential skew angles forming valleys 157 and 158 as described above. Side 240 angled inward relative to first vertex 171 forms a first vertex angle 246 that is smaller than second vertex angle 248, where side 242 is angled outward relative to vertex 172. Thus, the key segment has a more severe "point" at first vertex 171 than at second vertex 172. If first vertex 171 or second vertex 172 is positioned closer to the path of a tumbler pin (i.e., closer to vertical pin axis 161) when the key is inserted into a lock (not shown), the pin may become caught on first vertex 171 or second vertex 172. The pin is more likely to become caught on first vertex 171 than second vertex 172 because first vertex angle 246 is more acute than second vertex angle 248 and side 240 extends inward relative to first vertex 171 and top lateral edge 177 rather than outward.

As the key is inserted into a lock, tumbler pins with beveled ends slide over the "V" cut vertical bittings. Pushing the key into the lock forces the pins to rotate. A pin contacts and travels up a first side of a peak of the bitting. The pin rotates to align its beveled end with the skew angle of the first side of the peak. When the pin slides down a second side of the peak, a spring pushes the pin down and the pin rotates to align its beveled end with the skew angle of the second side of the peak. Before the pin slides down the second side of the peak, if a vertex of a peak is positioned near the path of the beveled end of the pin, the pin may become caught on the vertex and not rotate correctly. The pin is more likely to become caught on an inward extending warding surface, particularly if the inward extending warding surface forms a vertex having a more severe angle between the side of the peak and the top lateral edge. Interference of the bitting peak vertex with rotation of the pin is exacerbated if the pin includes a longitudinal slot that extends through the beveled end of the pin, and the vertex may become caught in the edge of this slot.

The interference of the vertices can be minimized by providing straight warding surfaces that are oriented perpendicular to a tumbler pin axis where the top lateral edges of the bitting peaks are formed. As further described below, horizontal warding surfaces, that are perpendicular to the vertical pin axis, minimize the interference of vertices formed by skew cut bittings on the top edge of a key blade segment for a vertical cylinder lock. Vertical warding surfaces that are perpendicular to a horizontal pin axis minimize the interference of vertices formed by skew cut bittings on the side edge or rib of a key blade segment for a horizontal cylinder lock.

Figure 11:
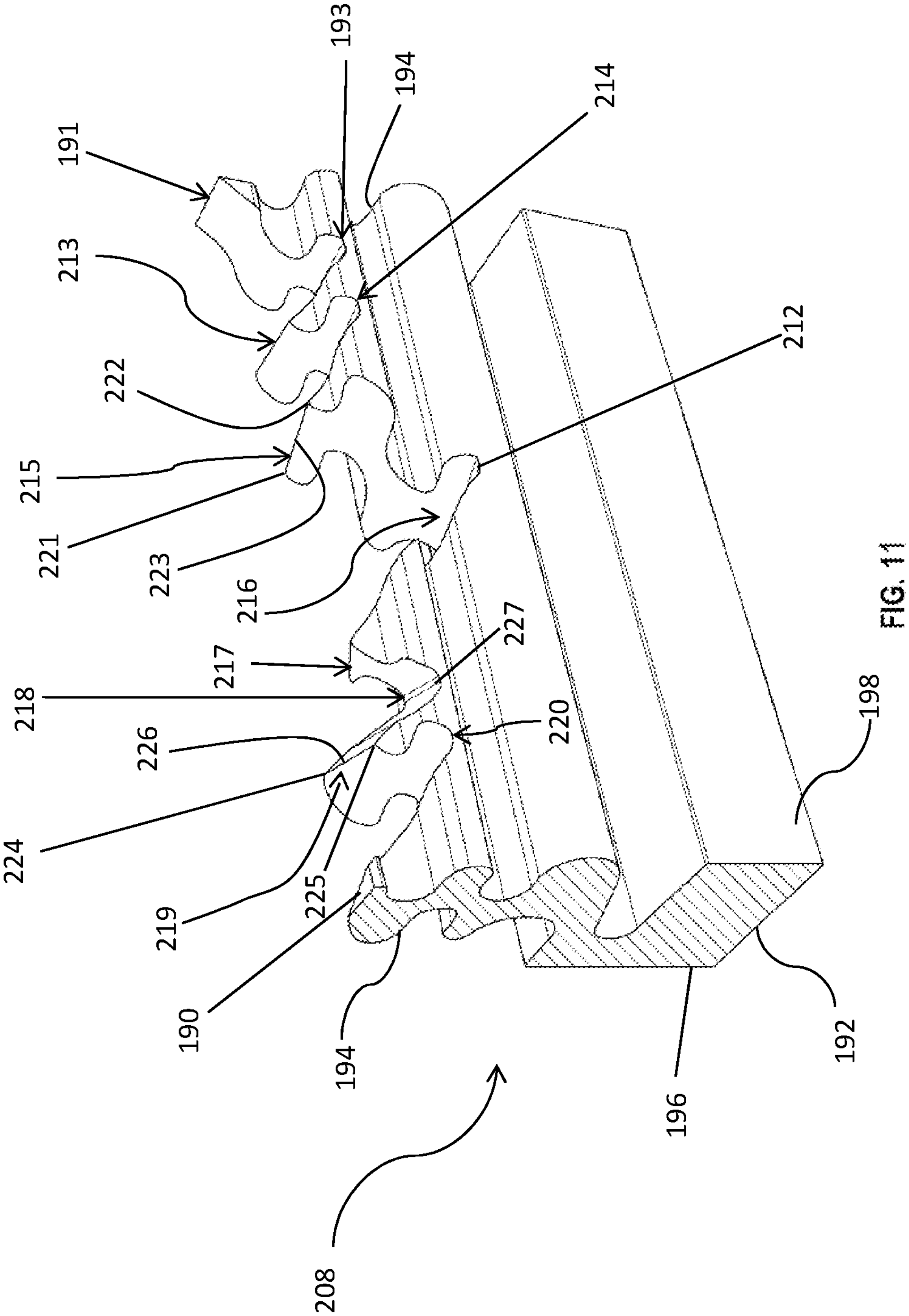
FIG. 11 is a partial, perspective view of a key blade segment with horizontal warding surfaces.
Figure 12:
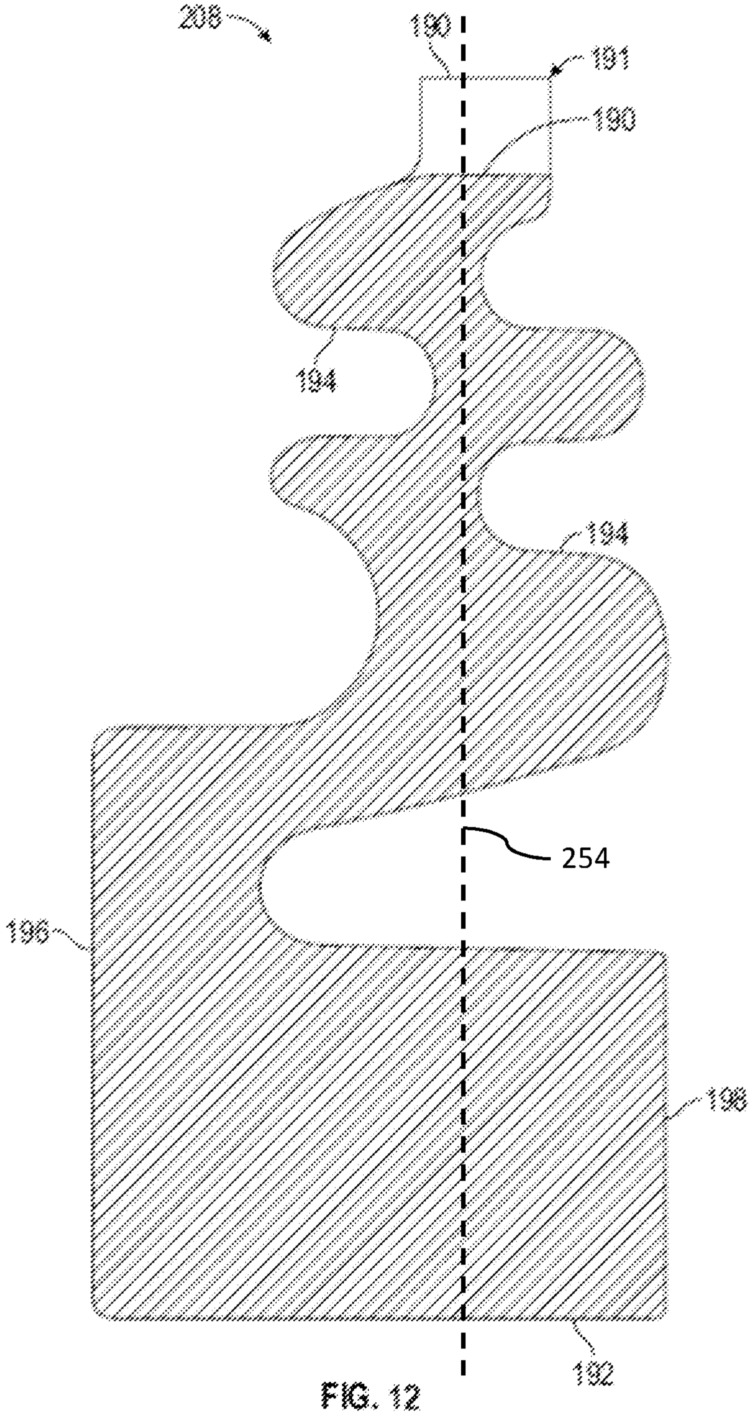
FIG. 12 is an end view of the key blade segment of FIG. 11.

FIGS. 11 and 12 depict a key blade segment 208 having a top edge 190, bottom edge 192, first side 196, and opposing second side 198, with horizontal warding surfaces 194 on the first side 196 and second side 198 of the key blade segment 208 and forming longitudinal warding grooves with horizontal upper and lower surfaces. The horizontal warding surfaces 194 are substantially parallel to the bottom edge 192 and perpendicular to a vertical tumbler pin axis 254. In this regard, the surfaces 194 are actually horizontally-oriented only when the key blade is oriented as shown in FIG. 12. In addition, as shown in FIG. 12, the warding grooves and ridges forming the horizontal warding surfaces 194 include peaks and valleys that are curved, and thus, the horizontal warding surfaces 194 constitute only portions of those grooves and ridges.

Vertical pin axis 254 represents the approximate center line of the key blade segment 208, which is also the general path that a vertical tumbler pin (not shown) would pass over when the key blade is inserted into a lock (not shown). In the embodiment shown in FIGS. 11 and 12, side 196 is offset from vertical pin axis 254, and horizontal bittings may be formed on side 196 as described above.

"V"-shaped vertical bittings are cut into the top edge 190, forming alternating peaks 191, 213, 215, 217, 219, and valleys 193, 214, 216, 218, 220. The lowest portion of each valley defines a thalweg or base or root, such as valley 216 defining thalweg or base 212 or valley 218 defining thalweg or base 227. Valleys formed in the vertical bittings, such as valleys 193, 214, 216, 218, 220, may have the same or varying depths. In various embodiments, however, the maximum depth of any valley should be such that remaining material under the cut (i.e., the material between the thalweg or base of the valley and the bottom edge of the key blade) is not less than one-third of the height of the original, unbitted key blank blade in order to maintain the structural integrity of key blade.

The "V"-shaped valleys 193, 214, 216, 218, 220 of the vertical bittings may be cut in an unskewed orientation (i.e., perpendicular to a longitudinal axis of the blade) or at a skewed orientation (i.e., at a non-perpendicular angle with respect to the longitudinal axis of the blade). Details of a bitting peak are described with reference to peak 215 and peak 219. Peak 215 is defined by a first vertex 221 on the first side 196 of the key blade segment 208 and a second vertex 222 on the second side 198 of the key blade segment 208 with a top lateral edge 223 extending between the first vertex 221 and the second vertex 222. Peak 219 is defined by a first vertex 224 on the first side 196 of the key blade segment 208 and a second vertex 225 on the second side 198 of the key blade segment 208 with a top lateral edge 226 extending between the first vertex 224 and the second vertex 225. The differential skew angles of the adjacent valleys 214 and 216 forming peak 215 (i.e., the skew angle of valley 214 with respect to the longitudinal axis of the blade as compared to the skew angle of valley 216 with respect to the longitudinal axis of the blade) result in a vertical offset between the first vertex 221 and the second vertex 222. Similarly, the differential skew angles of the adjacent valleys 218 and 220 forming peak 219 result in a vertical offset between the first vertex 224 and the second vertex 225. The offset between the first vertex 221 and the second vertex 222 of peak 215 is less than (i.e., top lateral edge 223 is more horizontal) than the offset between the first vertex 224 and the second vertex 225 of peak 219. This is because the skew angles of the adjacent valleys 214 and 216 forming peak 215 are at a greater differential angle relative to the longitudinal axis of the blade compared to the skew angles of the adjacent valleys 218 and 220 forming peak 219.

Figure 13:
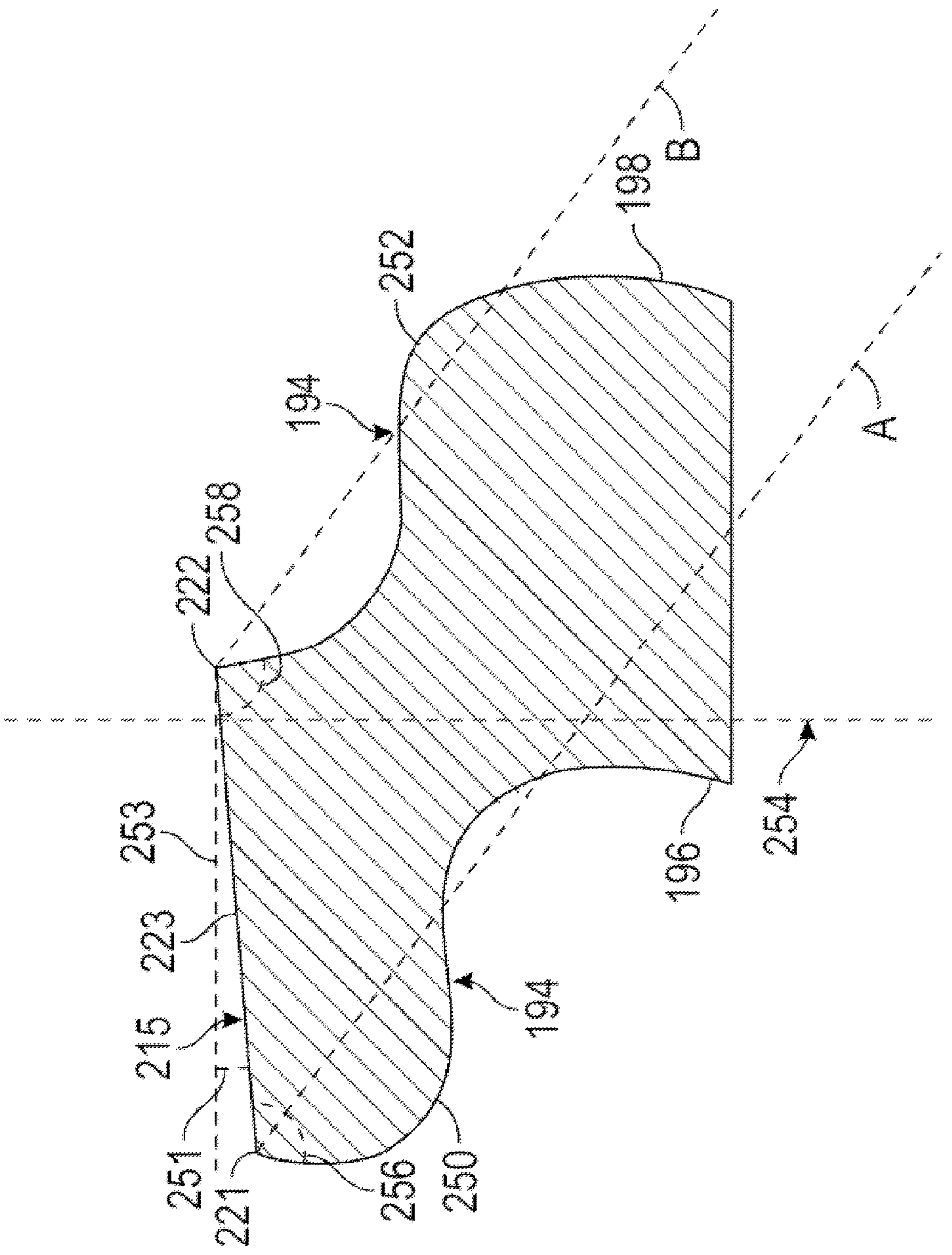
FIG. 13 is a partial, transverse cross-sectional view of one peak of the key blade segment of FIG. 11.

FIG. 13 is a partial cross-sectional view of peak 215 through and parallel to top lateral edge 223 (i.e., the cross section is not perpendicular to the longitudinal axis of the blade). Peak 215 has a first side 250 and a second side 252. As shown in FIG. 13, vertex 221 on the first side 250 of peak 215 is offset at a lower position (relative to horizontal) than vertex 222 on the second side 252 of peak 215 so that top lateral edge 223 is tilted in a counterclockwise direction by an angle 251 between the top lateral edge 223 and an axis 253 parallel to the bottom edge 192 (horizontal in FIG. 13). Side 250 corresponds to the horizontal warding surface 194 on the first side 196 of the key blade segment, and side 252 corresponds to the horizontal warding surface 194 on the second side 198 of the key blade segment. Side 250 extends outward relative to vertex 221 and top lateral edge 223, thereby forming a first vertex angle 256 between top lateral edge 223 and side 250. Side 252 extends outward relative to vertex 222 and top lateral edge 223, thereby forming a second vertex angle 258 between top lateral edge 223 and side 252. Vertex angle 256 does not form a severe "point" at vertex 221 because of the shape of the warding surface 194 on side 250 and the angle 251 of the top lateral edge 223, which in turn is determined by the differential skew angles forming peak 215. Vertex angle 258 does not form a severe "point" at vertex 222 because of the shape of the warding surface 194 on side 252 of the key blade and the angle 251 of the top lateral edge 223, which in turn is determined by the differential skew angles forming peak 215. Vertex 222 is positioned closer to the path of a tumbler pin, (i.e., closer to vertical pin axis 254) when the key is inserted into a lock (not shown) than vertex 221 and is more likely to contact the vertical tumbler pin. However, since side 252 extends outward relative to vertex 222 and top lateral edge 223, and vertex angle 258 does not form a severe "point" at vertex 222, the tumbler pin is less likely to become caught on vertex 222. If the tumbler pin contacts vertex 221, the pin is unlikely to become caught on vertex 221 because side 250 extends outward relative to vertex 221 and top lateral edge 223, and vertex angle 256 does not form a severe "point" at vertex 221.

To illustrate the effects of angled or horizontal warding surfaces on the severity of the vertex angle formed on bitting peaks, dashed lines A and B superimposed on FIG. 13 illustrate angled warding surfaces. As can be appreciated, while vertex angle 258 would be larger (less acute, more obtuse) on an angled warding surface represented by line B, vertex angle 256 would be smaller (more acute) forming a more "severe" point at vertex 221 on an angled warding surface represented by line A. Consequently, if the tumbler pin contacts vertex 221 on an angled warding surface as illustrated by line A and line B, the pin would be more likely to become caught on vertex 221 because line A extends inward relative to vertex 221 and top lateral edge 223, and vertex angle 258 forms the severe "point" at vertex 221.

In some embodiments, the key blade contains only horizontal warding surfaces between the top edge and the maximum bitting depth. In other embodiments, the key blade contains outward angled warding surfaces between the top edge and the maximum bitting depth. The warding shape below the maximum bitting depth will not impact the formation of interfering vertices because no top lateral edge will extend beyond this point. In some embodiments, the maximum bitting depth is not less than one-third of the height of the blade from the bottom edge.

A POSA would appreciate that the shape or contour of a keyway of a lock may correspond to the shape or contour of the key blade configured to be inserted into the keyway to operate the lock. In some embodiments, a keyway corresponding to the key blade described above contains only horizontal warding surfaces between a top edge of the keyway and a maximum bitting depth of the corresponding key blade. In other embodiments, the keyway corresponding to the key blade described above contains outward angled warding surfaces between the top edge of the keyway and the maximum bitting depth of the corresponding key blade.

The process of cutting skew cut bittings on the side edge of a key blade for a horizontal cylinder lock may similarly produce vertices which can interfere with the rotation of tumbler pins of a horizontal lock. As described above in connection with the vertically-oriented key blade for a vertical lock, the interference of vertices in connection with a horizontally-oriented key blade for a horizontal lock can be minimized by orienting vertical warding surfaces perpendicular to a horizontal pin axis where top lateral edges of the bitting peaks are formed.

Figure 14:
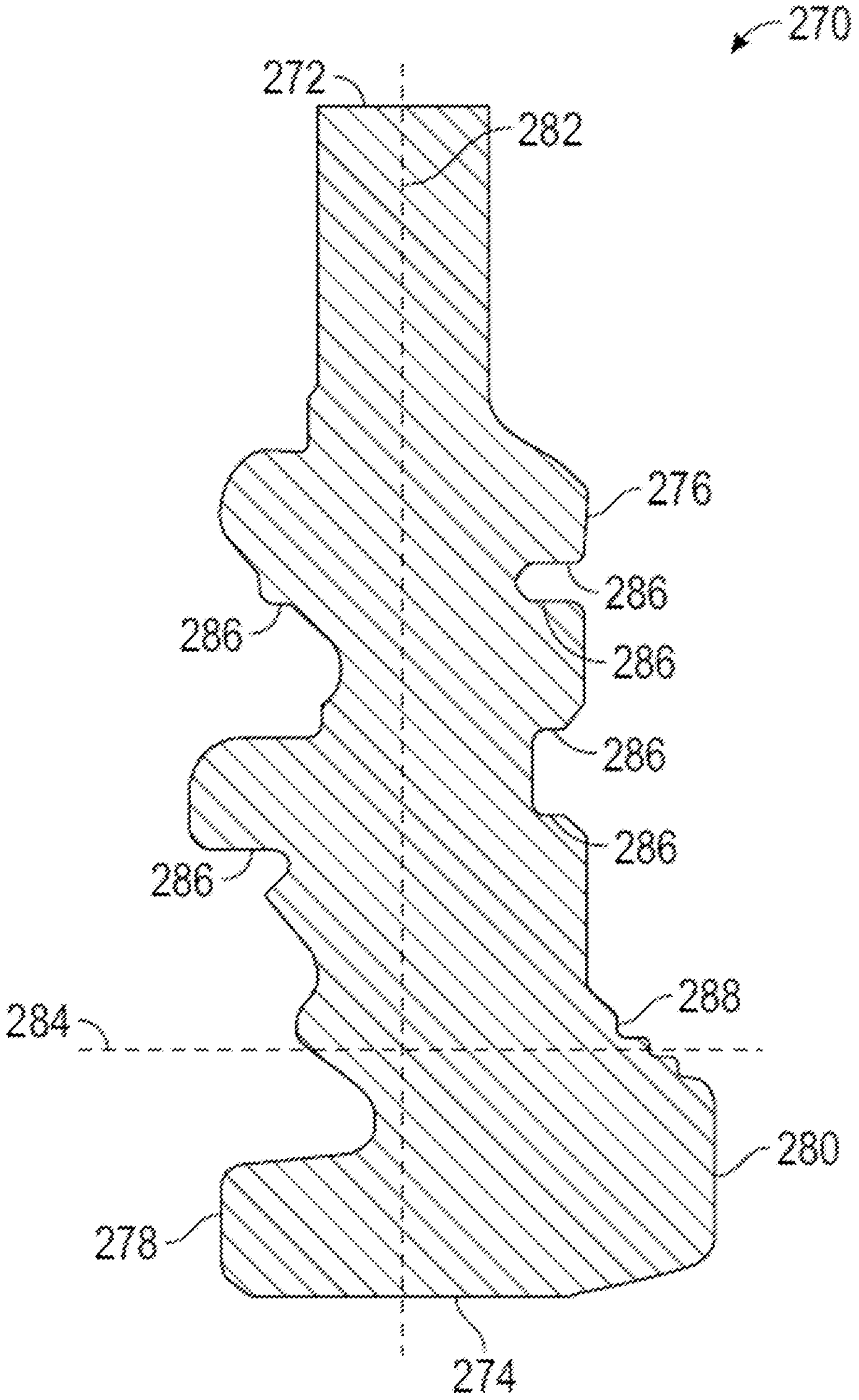
FIG. 14 is a transverse cross-sectional view of an alternate key blade.

FIG. 14, depicts an embodiment of a cross-sectional shape of a key blade 270 of a key blank configured to receive edge bitting cuts and/or side bitting cuts so that a key formed from the blank may be operable in a vertical and/or a horizontal lock. The cross-sectional shape of the key blade 270 is defined by a primary top edge 272 having formed therein, or configured to have formed therein, bitting cuts for operating a vertical lock (e.g., elevating (positioning) and rotating the tumbler pins when the key blade is inserted into a keyway that is oriented parallel to the tumbler pins), a bottom edge 274, a first side 276 having formed therein, or configured to have formed therein, bitting cuts for operating a horizontal lock (e.g., elevating (positioning) and rotating the tumbler pins when the key blade is inserted into a keyway that is oriented perpendicular to the tumbler pins), and an opposed second side 278. The first side 276 includes a longitudinal rib 280 extending along some or all of the length of the blade 270. Vertical pin axis 282 represents the approximate center line of the key blade segment 270 which is also the general path that a tumbler pin (not shown) configured for the vertical bittings would pass over when the key blade 270 is inserted into a keyway of a lock (not shown) that is oriented parallel to the pin axis 282. Horizontal warding surfaces 286 perpendicular to the vertical pin axis 282 are formed on the first side 276 and the second side 278 of the key blade and minimize the interference of vertices in connection with bitting cuts for operating the vertical lock as described above with respect to FIGS. 11-13.

Horizontal pin axis 284 represents the approximate center line of a tumbler pin (not shown) configured for the horizontal bittings. The horizontal pin axis 284 may be positioned at any point along the path the horizontal tumbler pin would pass over when the key blade is inserted into a keyway of a lock (not shown) that is oriented perpendicular to the pin axis 284. Vertical warding surfaces 288 perpendicular to the horizontal pin axis 284 are formed on the rib 280 and minimize the interference of vertices in connection with bitting cuts for operating the horizontal lock. In other embodiments, the vertical warding surfaces 288 may be positioned at any point where top lateral edges of the horizontal bitting peaks (not shown) are formed.

Figure 15:
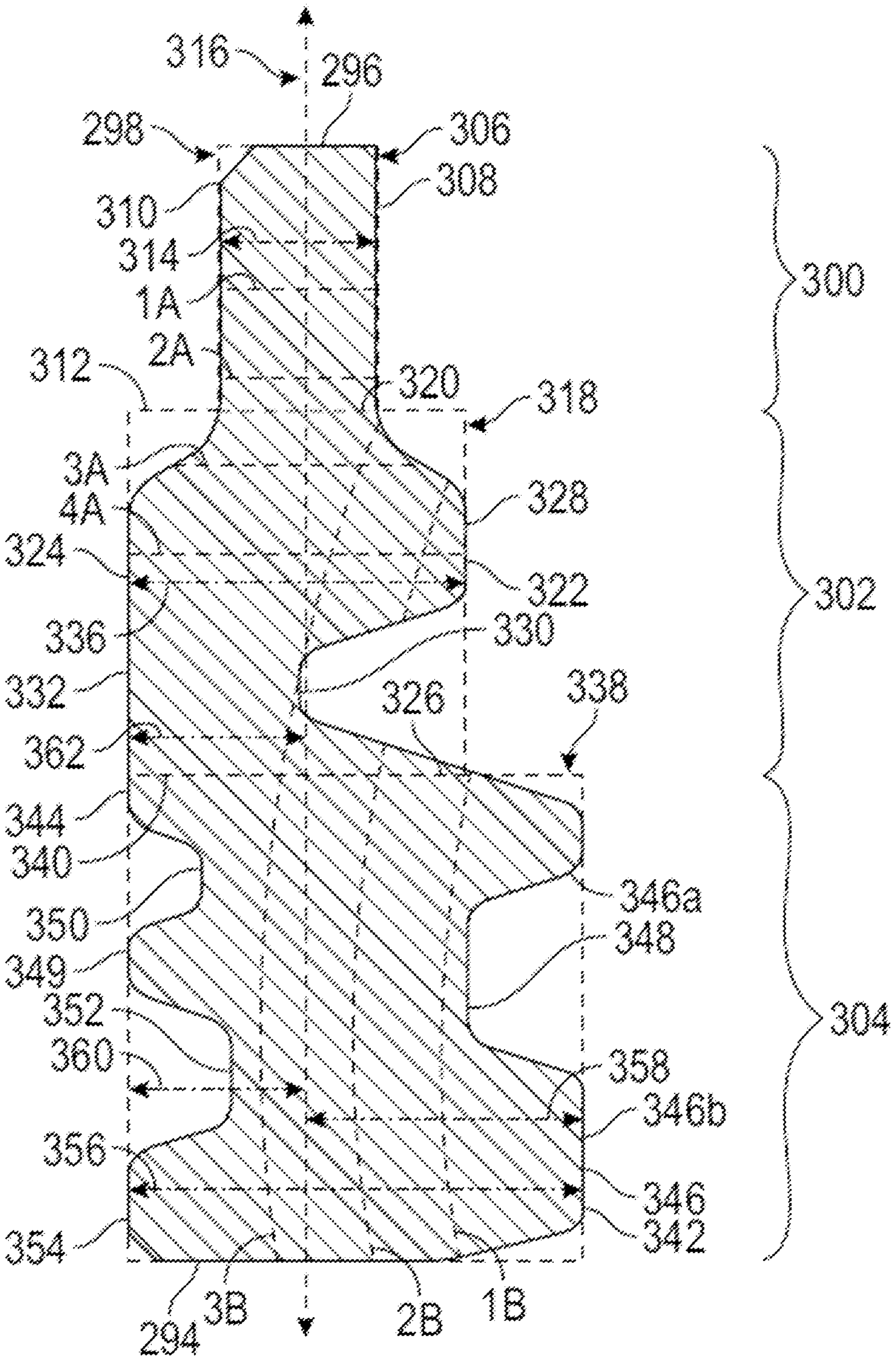
FIG. 15 is a transverse cross-sectional view of an additional alternate key blade.
Figure 16:
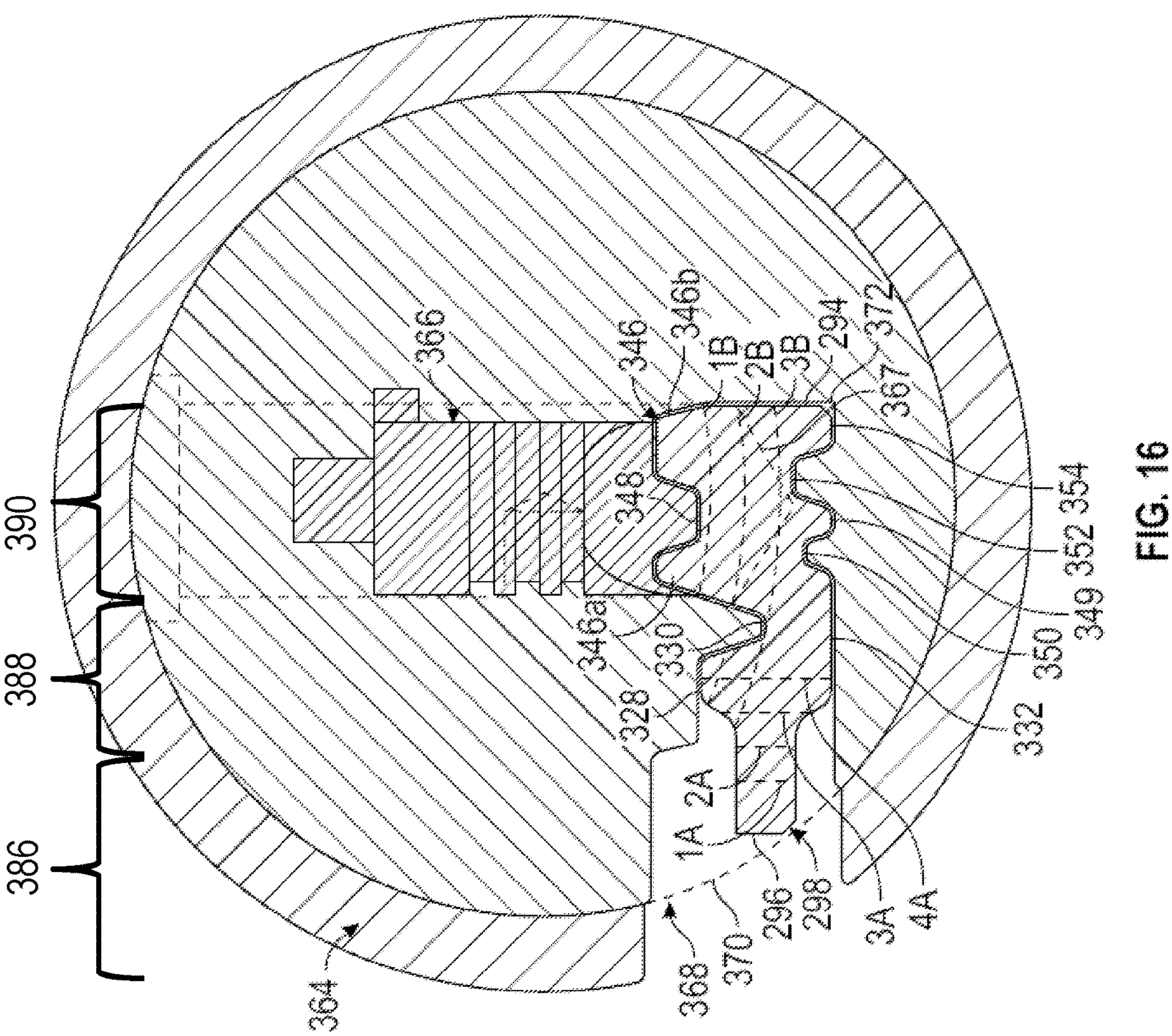
FIG. 16 is a transverse cross-sectional view of the key blade of FIG. 15 and a keyway of a lock with a horizontally-oriented keyway and a tumbler pin.
Figure 17:
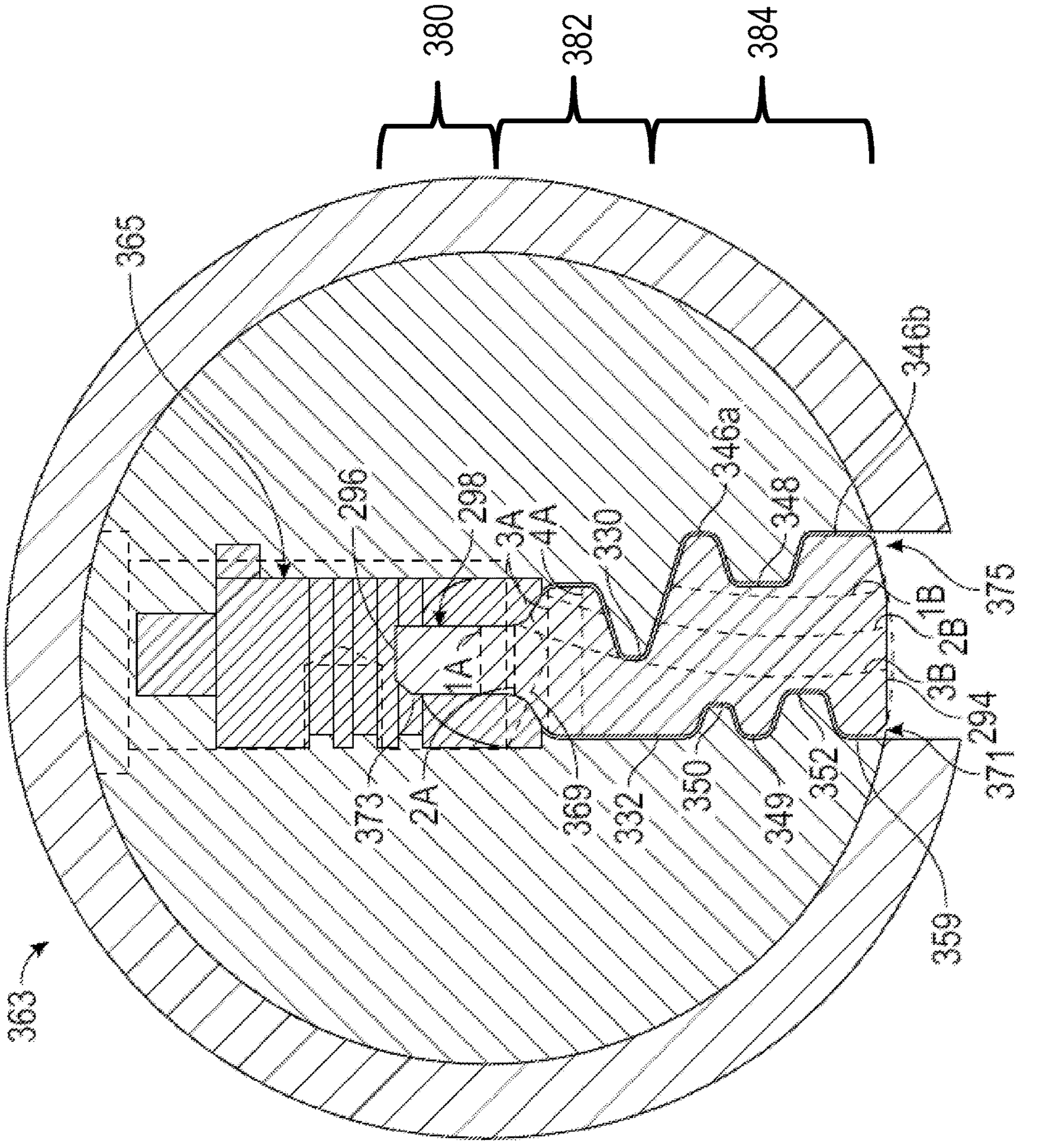
FIG. 17 is a transverse cross-sectional view of the key blade of FIG. 15 and a keyway of a lock with a vertically-oriented keyway and a tumbler pin.

FIGS. 15,16, and 17 depict a cross-section of an embodiment of a blade 298 of a key blank having a top, or first, edge 296, a first side 342, a second side 344 and a bottom, or second, edge 294. Top edge 296 is configured to receive edge bitting cuts and first side 342 is configure to receive side bitting cuts so that a key formed from the blank may be operable in a vertical and/or a horizontal lock, as applicable, similar to FIG. 6 described above.

Referring to FIG. 15, the cross-sectional shape of the blade 298 includes three distinct keyway segments 300, 302, 304 between the top edge 296 and bottom edge 294. First segment 300 is encompassed by a rectangular envelope 306 defined by top edge 296 (corresponding with the top edge 296 of the blade 298) a first side boundary 308, a second side boundary 310, and a lower boundary 312. First side boundary 308 and second side boundary 310 correspond to physical side surfaces of blade 298 within segment 300, but lower boundary 312 is not a physical edge of the blade 298 but represents a boundary between first segment 300 and second segment 302. The top edge 296 is configured to receive edge bitting cuts as described above. The edge bittings may extend to various depths relative to the top edge 296, for example, as indicated by dimension lines 1A-4A. In the embodiment shown in FIG. 15, the edge bittings will not extend to a depth greater than the dimension shown by line 4A to maintain the integrity of the blade. First side boundary 308 and second side boundary 310 of the first segment 300 have a first thickness 314 therebetween, with the first side boundary 308 and the second side boundary 310 equidistant from a centerline 316 extending through the blade from the top edge 296 to the bottom edge 294. The side boundaries 308, 310 of envelope 306 correspond to portions of the segment 300 furthest distant from the centerline 316. In the illustrated embodiment, side boundaries 308, 310 of envelope 306 correspond to opposed, parallel sides of the blade 298 within segment 300. Lower boundary 312 of the envelope 306 is defined as the point at which the opposed sides of the blade 298 are no longer parallel and begin to flare outwardly from the centerline 316.

In the embodiment shown in FIG. 15, first segment 300 does not include warding grooves and/or ridges.

Second segment 302 is encompassed by a rectangular envelope 318 defined by upper boundary 320 (corresponding to lower boundary 312 of envelope 306), a first side boundary 322, a second side boundary 324, and a lower boundary 326. Upper boundary 320 and lower boundary 326 are not physical edges of the blade 298, but represent boundaries between first segment 300 and second segment 302 and between second segment 302 and third segment 304, respectively. The second segment 302 may be further characterized by various warding features that fall within the envelope 318. The side boundaries 322, 324 of envelope 318 correspond to portions of the segment 302 furthest distant from the centerline 316. In the illustrated embodiment, FIG. 15 depicts the right side of segment 302 having a peak or plateau 328 and a paracentric groove 330, which extends beyond the centerline 316 from the first side boundary 322 in the direction of the second side boundary 324. The paracentric groove 330 is positioned at a transition between the second segment 302 and the third segment 304. In other embodiments the paracentric groove 330 may be located at any position in the second segment 302 below the deepest bitting cut (e.g. as shown by dimension line 4A) or any position in the third segment 304. The left side of segment 302 has a plateau 332 which extends the length of the second segment 302 and continues into the third segment 304. First side boundary 322 of envelope 318 corresponds to the peak 328 being the maximum distance from the centerline 316. Second side boundary 324 of envelope 318 corresponds to the plateau 332, being the maximum distance from the centerline 316. First side boundary 322 and second side boundary 324 are equal distant from the centerline 316, and a maximum width 336 of segment 302 is defined as the distance from first side boundary 322 to second side boundary 324, or the distance from peak 328 to peak 332.

Maximum width 336 of segment 302 (envelope 318) is greater than maximum width 314 of segment 300 (envelope 306).

Lower boundary 326 of the envelope 318 is defined as the point at which the right side of the blade 298 extends outwardly from groove 330 and is no longer equidistant from centerline 316 as second side boundary 324 of envelope 318.

The third segment 304 is encompassed by a rectangular envelope 338 defined by an upper boundary 340 (corresponding to lower boundary 326 of envelope 318), a first side boundary 342, a second side boundary 344, and the bottom edge 294. Upper boundary 340 is not a physical edge of blade 298, but represents a boundary between second segment 302 and third segment 304. Third segment 304 includes a longitudinal rib 346 within the envelope 338 and is configured to receive side bitting cuts that may extend from bottom edge 294 into the right-hand side of segment 302. The side bittings may be cut to various depths relative to the first side 342, for example as shown by dimension lines 1B-3B.

The side boundaries 342, 344 of envelope 338 correspond to portions of the segment 304 furthest distant from the centerline 316. In the illustrated embodiment, FIG. 15 depicts the right side of segment 304 having longitudinal rib 346 with a warding groove 348 bisecting the rib 346 into an upper rib portion 346*a* and lower rib portion 346*b*, and the left side of segment 304 having a peak 349 between two grooves defining valleys 350, 352 as well as a lobe 354. First side boundary 342 of envelope 338 corresponds to the outer edge of rib 346 (i.e., portion furthest from centerline 316), and second side boundary 344 of envelope 338 corresponds to the outer edge of peak 349 or lobe 354 (i.e., portions equally furthest from centerline 316). The maximum width 356 of segment 304 is defined as the distance from first side boundary 342 to second side boundary 344, or the distance from rib 346 to peak 349.

The maximum thickness 356 of segment 304 is greater than the maximum thickness 314 of segment 300 and the maximum thickness 336 of segment 302, and the first side boundary 342 and second side boundary 344 are not equidistant from the centerline 316. Rather, a distance 358 between the centerline 316 and the first side boundary 342 of the envelope 338 is greater than a distance 360 from the centerline 316 to the second side boundary 344 of envelope 338. The distance 360 between the centerline 316 and the second side boundary 344 of envelope 338 is equal to a distance 362 between the centerline 316 and the second side boundary 324 of envelope 318, so that the second side boundary 344 of envelope 338 is coplanar with the second side boundary 324 of envelope 318. Thus, while first segment 300 and second segment 302 are symmetric with respect to centerline 316, third segment 304 is asymmetric with respect to centerline 316.

FIG. 16 depicts a cross-sectional view of a horizontal lock 364, a tumbler pin 366 having a beveled end 367, and blade 298 having one or more side bittings. The horizontal lock 364 has an outer housing with a cylinder or plug rotatably housed within the housing and a horizontally-oriented, axially a keyway 368 profile between an open first side 370 and an enclosed second side 372 corresponding to the shape or contour of the key blade 298. Keyway 368 includes features corresponding to contour features of first side 342 of key 298, such as a ridge corresponding to paracentric groove 330, grooves corresponding to upper rib portion 346*a* and lower rib portion 346*b*, and a ridge corresponding to warding grove 348. In addition, keyway 368 includes features corresponding to contour features of second side 344 of key 298, such as a groove conforming to lobe 354, a ridge corresponding to valley 352, a groove corresponding to peak 349, and a ridge corresponding to valley 350.

As the key blade 298 is inserted into the keyway 368, the tumbler pin 366 contacts the upper portion 346*a* and lower portion 346*b* of the rib 346 in the third segment 304 and the beveled end 367 extends into the warding groove 348. As the key blade 298 moves through the keyway 368 to a fully inserted position as shown in FIG. 16, the beveled end 367 of the tumbler pin 366 contacts a corresponding side cut which elevates and rotates the tumbler pin 366 into an unlocked position.

FIG. 17 depicts a cross-sectional view of a vertical lock 363, a tumbler pin 365 having a beveled end 369, and blade 298 having one or more edge bittings. The vertical lock 363 has an outer housing with a cylinder or plug rotatably housed within the housing and a vertically-oriented, axially a keyway 375 profile between an open first side 371 and an enclosed second side 373 corresponding to the shape or contour of the key blade 298. Keyway 375, which is configured to receive key 298, includes features corresponding to paracentric groove 330, upper rib portion 346*a* and lower rib portion 346*b*, warding grove 348, lobe 354, valley 352, peak 349, and valley 350.

As the key blade 298 is inserted into the keyway 375, the beveled end 369 of the tumbler pin 365 contacts the top edge 296 of the key blade 298 in the first segment 300. As the key blade 298 moves through the keyway 375 to a fully inserted position as shown in FIG. 17, the beveled end 369 of the tumbler pin 365 contacts a corresponding edge bitting which elevates and rotates the tumbler pin 365 into an unlocked position.

In some embodiments, the key blade contains only vertical warding surfaces. In other embodiments, the key blade contains vertical warding surfaces and horizontal warding surfaces.

Referring to FIG. 17, vertically-oriented keyway 375 may be divided into first 380, second 382, and third 384 keyway segments of relative widths and symmetry corresponding to segments 300, 302, 304, respectively, of key blade 298. Referring to FIG. 16, horizontally-oriented keyway 368 may be divided into first 386, second 388, and third 390 keyway segments, with second and third 388, 390 keyway segments of relative widths and symmetry corresponding to second and third segments 302, 304, respectively, of key blade 298.

A POSA would appreciate that the shape or contour of a keyway of a lock may correspond to the shape or contour of the key blade configured to be inserted into the keyway to operate the lock. In some embodiments, a keyway of a horizontal cylinder lock corresponds to a key blade having only vertical warding surfaces (such as vertical warding surfaces 288). In other embodiments, a cylinder lock configured to receive edge bitting cuts and side bitting cuts so that a key formed from the blank may be operable in a vertical and/or a horizontal lock corresponds to a key blade having vertical warding surfaces (such as vertical warding surfaces 288) and horizontal warding surfaces (such as horizontal warding surfaces 286).

Further, it could be appreciated that a key made from a modified key blank having a key blade with a cross-sectional shape encompassing only the third segment 304 (i.e., including only warding groove 348, upper rib portion 346*a*, lower rib portion 346*b*, a peak 349, valleys 350, 352, and lobe 354 and not including any portion of the key blade 298 corresponding to first segment 300 or second segment 302), or a cross-sectional shape encompassing only the second segment 302 and third segment 304 (and not including any portion of the key blade corresponding to first segment 300) and having appropriate side bittings that are complementary to tumbler pin(s) 366 could operate the horizontal lock 364 of FIG. 16. Such a modified key could not, however, operate the vertical lock 363 of FIG. 17.

Figure 18:
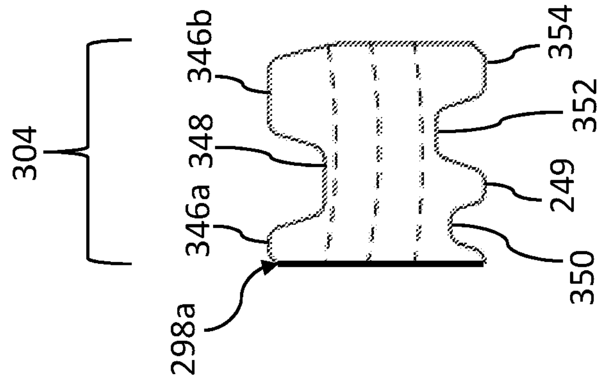
FIG. 18 is a transverse cross-sectional view of a modified key blade encompassing only a third segment of the key blade of FIG. 15.
Figure 23:
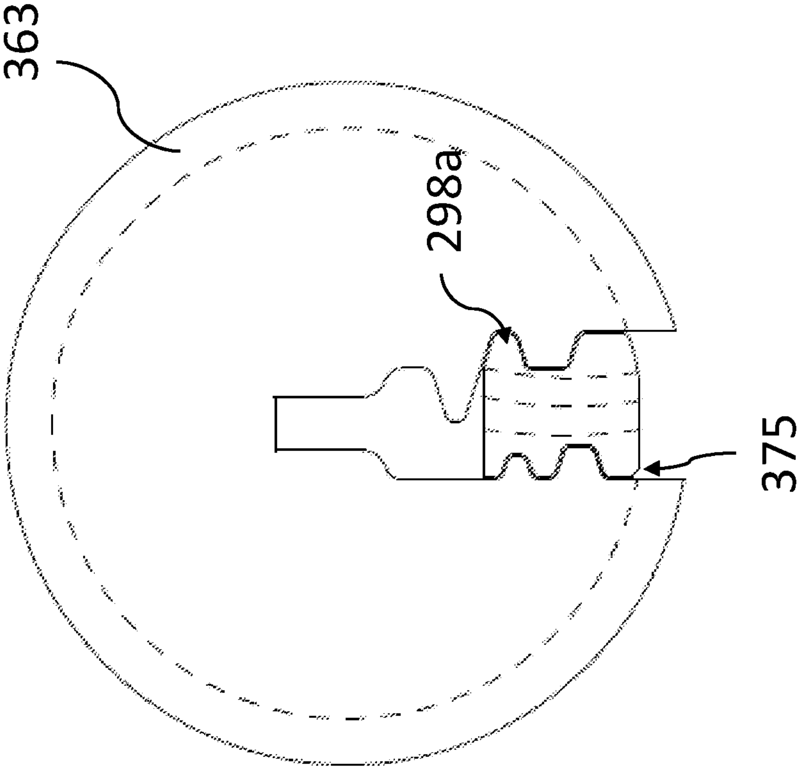
FIG. 23 is a transverse cross-sectional view of the modified key blade of FIG. 18 and a keyway of a lock with a vertically-oriented keyway.
Figure 22:
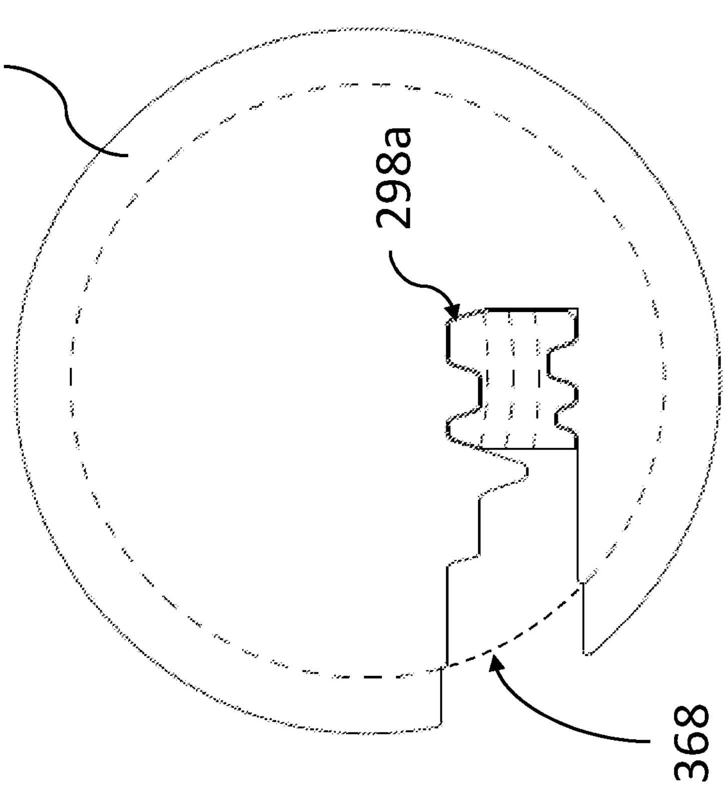
FIG. 22 is a transverse cross-sectional view of the modified key blade of FIG. 18 and a keyway of a lock with a horizontally-oriented keyway.

FIG. 18 depicts an embodiment of a modified key blank having a key blade 298*a* with a cross-sectional shape encompassing only the third segment 304, including only warding groove 348, upper rib portion 346*a*, lower rib portion 346*b*, a peak 349, valleys 350, 352, and lobe 354 and not including any portion of the key blade 298 corresponding to first segment 300 or second segment 302. FIG. 22 shows a cross-sectional view of modified key blade 298*a* inserted into horizontal lock 364 with horizontally-oriented keyway 368. FIG. 23 shows a cross-sectional view of modified key blade 298*a* inserted into vertical lock 363 with vertically-oriented keyway 375.

Figure 19:
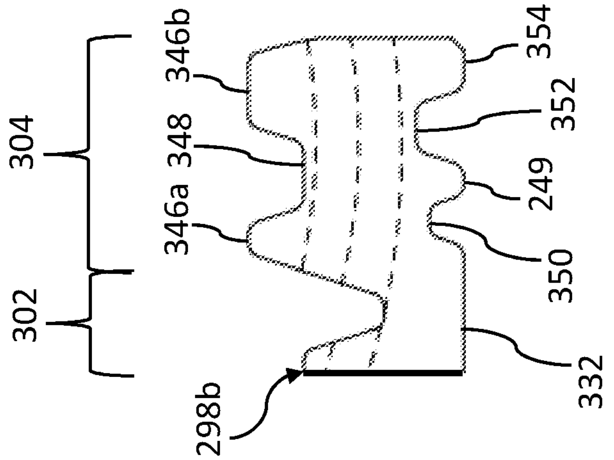
FIG. 19 is a transverse cross-sectional view of a modified key blade encompassing only a second segment and third segment of the key blade of FIG. 15.
Figure 25:
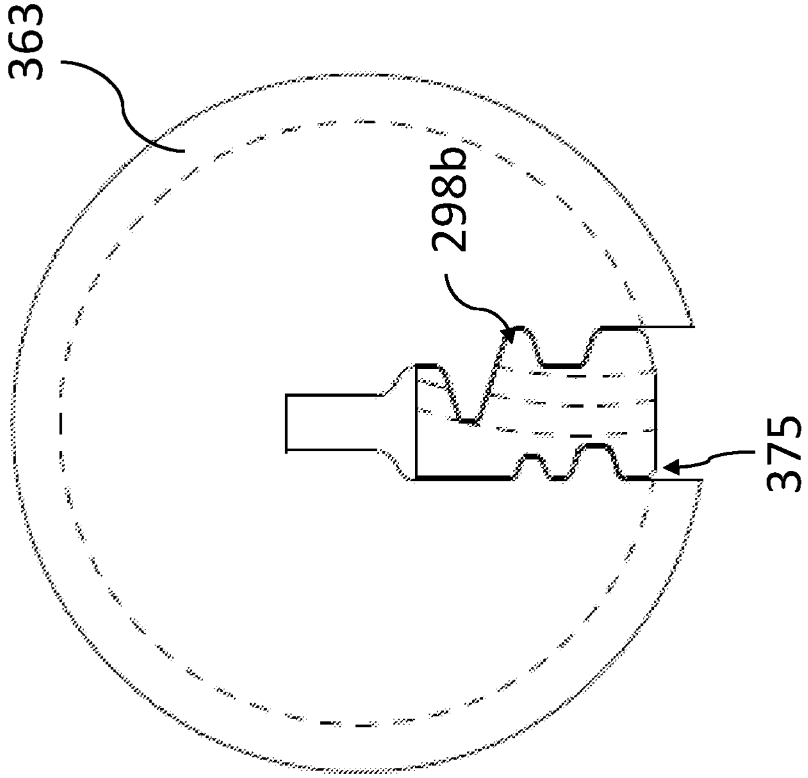
FIG. 25 is a transverse cross-sectional view of the modified key blade of FIG. 19 and a keyway of a lock with a vertically-oriented keyway.
Figure 24:
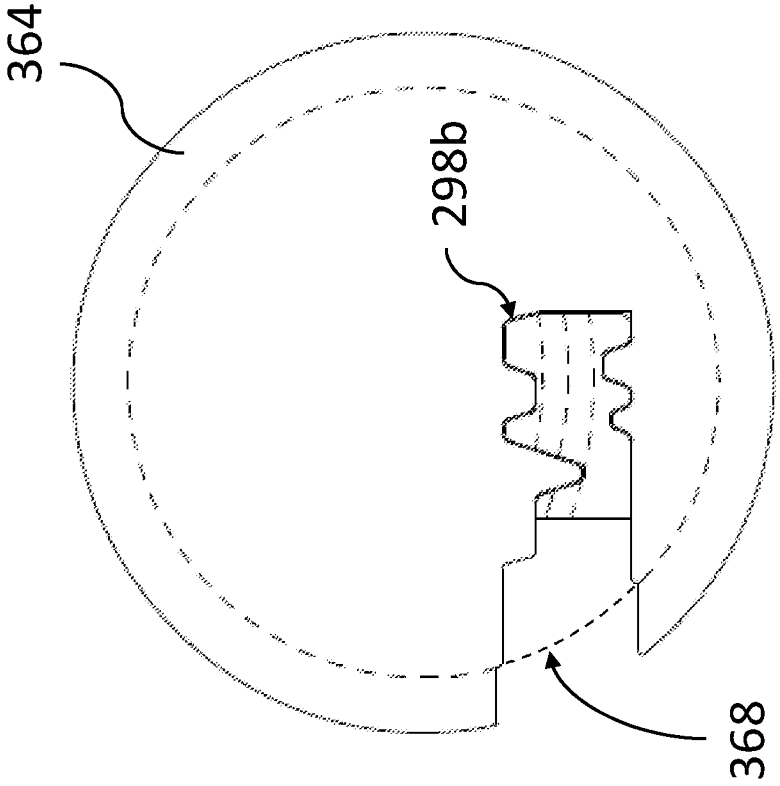
FIG. 24 is a transverse cross-sectional view of the modified key blade of FIG. 19 and a keyway of a lock with a horizontally-oriented keyway.

FIG. 19 depicts an embodiment of a modified key blank having a key blade 298*b* with a cross-sectional shape encompassing only the second segment 302 and third segment 304 (and not including any portion of the key blade 298 corresponding to first segment 300). FIG. 24 shows a cross-sectional view of modified key blade 298*b* inserted into horizontal lock 364 with horizontally-oriented keyway 368. FIG. 25 shows a cross-sectional view of modified key blade 298*b* inserted into vertical lock 363 with vertically-oriented keyway 375.

Figure 20:
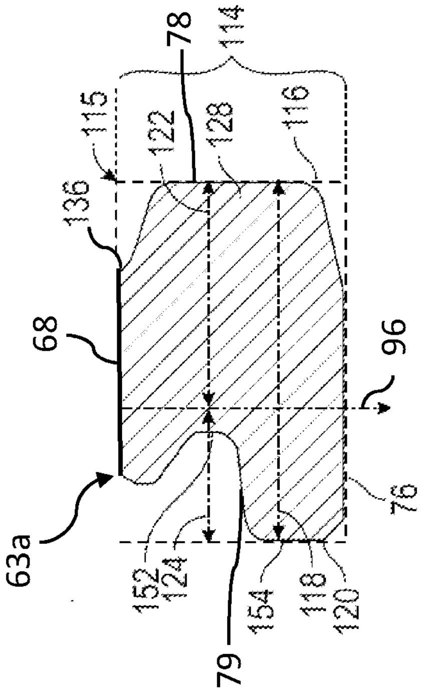
FIG. 20 is a transverse cross-sectional view of a modified key blade encompassing only a third segment of the key blade of FIG. 6.

FIG. 20 depicts an embodiment of a modified key blank having a key blade 63*a* with a first edge 68, a second edge 76, a first side surface 78, and an opposed second side surface 79 defining a cross-sectional shape encompassing only the third segment 114, including only longitudinal rib 128, undercut 152, lobe 154, and not including any portion of the key blade 63 corresponding to first segment 98 or second segment 106.

Figure 21:
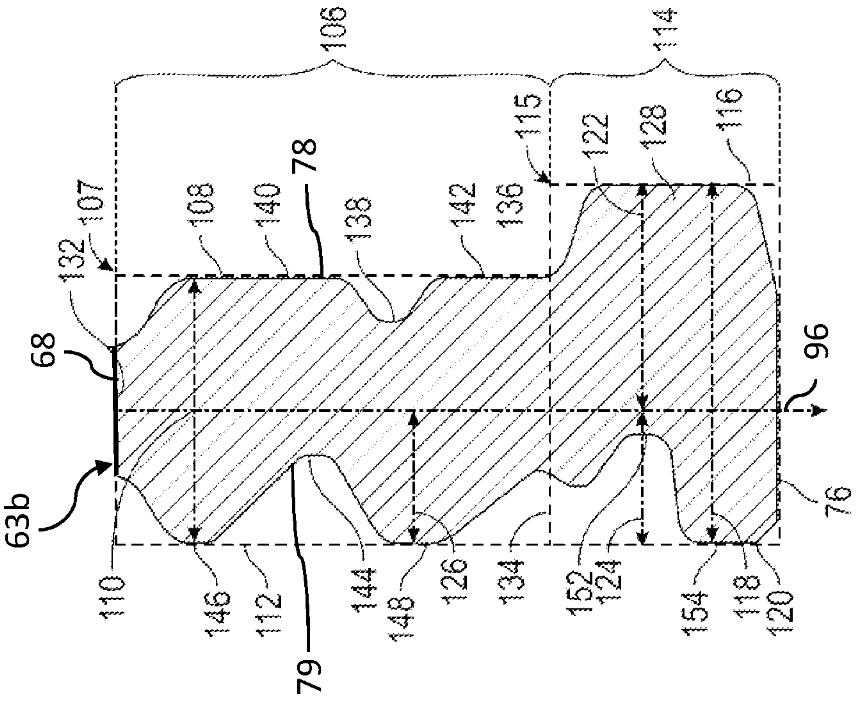
FIG. 21 is a transverse cross-sectional view of a modified key blade encompassing only a second segment and third segment of the key blade of FIG. 6.

FIG. 21 depicts an embodiment of a modified key blank having a key blade 63*b* with a first edge 68, a second edge 76, a first side surface 78, and an opposed second side surface 79 defining a cross-sectional shape encompassing only the second segment 106 and third segment 114 (and not including any portion of the key blade 63 corresponding to first segment 98).

In various embodiments, a key blank or modified key blank may be formed into a key and used in a lock system comprising a vertical cylinder lock, such as vertical cylinder lock 4 in FIG. 1 and vertical cylinder lock 363 in FIG. 17, and a horizontal cylinder lock, such as horizontal cylinder lock 34 in FIG. 2 and horizontal cylinder lock 364 shown in FIG. 16.

In one embodiment, the vertical cylinder lock 4 or 363 comprises a housing, a cylinder rotatably disposed within the housing, and a vertically-oriented keyway 2 or 375 within the cylinder, as shown in FIGS. 1 and 17. The vertically-oriented keyway 2 has a height and a width that is less than the height. The vertically-oriented keyway 2 is configured to receive a key blade, for example blade 63 shown in FIG. 6 or key blade 298 shown in FIG. 15.

Referring to FIGS. 1 and 17, the vertically-oriented keyway 2, 375 is divided into first keyway segment 45, 380, second keyway segment 47, 382, and third keyway segment 49, 384 along its height. The first keyway segments 45, 380 correspond to first blade segments 98, 300, respectively, second keyway segments 47, 382 correspond to second blade segments 106, 302, respectively, and third keyway segments 49, 384 correspond to third blade segments 114, 304, respectively. The vertically-oriented keyway 2, 375 further includes least one twisting tumbler pin, e.g., pin 365 of FIG. 17, oriented within the cylinder so as to be parallel to the height of the vertically-oriented keyway 2, 375 and configured to be elevated and rotated by a complementary bitting formed on a first edge 68, 296 of a key inserted into the keyway 2, 375.

Referring to FIGS. 2 and 16, the horizontal cylinder lock 34, 364 comprises a housing, a cylinder rotatably disposed within the housing, a horizontally-oriented keyway 32, 368 within the cylinder. The horizontally-oriented keyway 32, 368 has a height and a width that is greater than the height. Like the vertically-oriented keyway 2 and 375, horizontally-oriented keyway 32, 368 is configured to receive a key blade, for example key blade 63 as shown in FIG. 6 and key blade 298 shown in FIG. 15

As shown in FIGS. 2 and 16, the horizontally-oriented keyway 32, 368 is divided into first keyway segment 59, 386, second keyway segment 53, 388, and third keyway segment 55, 390 along its width. The second keyway segments 53, 388 correspond to second blade segments 106, 302, respectively, and third keyway segments 55, 390 correspond to the third blade segment 114, 304, respectively. The horizontally-oriented keyway 32, 368 further includes at least one twisting tumbler pin, e.g., pin 366 of FIG. 16, oriented within the cylinder so as to be parallel to the height of the keyway 32, 368 and configured to be elevated and rotated by a complementary bitting formed on a first side surface 78, 342 of a key inserted into the keyway 32, 368. The tumbler pin of the horizontal cylinder lock 34, 364 is aligned primarily with the third keyway segment 55, 390 of the horizontally-oriented keyway 32, 368.

The lock system may further include a key having a key blade, such as such as blades 63, 63*a*, 63*b*, 270, 298, 298*a*, or 298*b* shown in FIGS. 3-6, 14-15, 18-21, wherein the blade has a cross sectional shape such that the key can be inserted into both the vertically-oriented keyways 2, 375 of the vertical cylinder locks 4, 363 and the horizontally-oriented keyways 32, 368 of the horizontal cylinder locks 34, 364. The cross sectional shape of the key is defined by at least one blade segment 114 or 304 corresponding to the third keyway segment 49, 384 of the vertically-oriented keyway 2, 375 of the vertical cylinder lock 4, 363 and the third keyway segment 55, 390 of the horizontally-oriented keyway 32, 368 of the horizontal cylinder lock 34, 364. The key has at least a bitting formed on the first side surface 78, 342 of the key and configured to elevate and rotate the at least one tumbler pin of the horizontal cylinder lock 34, 364.

In various embodiments, a key blank or modified key blank may be formed into a key for a horizontal cylinder lock, such as horizontal cylinder lock 34 in FIG. 2 and horizontal cylinder lock 364 shown in FIG. 16. The horizontal cylinder lock 34, 364 includes a housing, a cylinder rotatably disposed within the housing, and a horizontally-oriented keyway 32, 368 within the cylinder. The horizontally-oriented keyway 32, 368 has a height and a width that is greater than the height. The horizontally-oriented keyway 32, 368 is configured to receive a key blade, for example blade 63 as shown in FIG. 6 and key blade 298 shown in FIG. 15.

Referring to FIGS. 2 and 16, the horizontally-oriented keyway 32, 368 is divided into first keyway segment 59, 386, second keyway segment 53, 388, and third keyway segment 55, 390 along its width. The first keyway segment 59, 386 corresponds to the first blade segment 98, 300, the second keyway segment 53, 388 corresponds to the second blade segment 106, 302, and the third keyway segment 55, 390 corresponds to the third blade segment 114, 304. The horizontal cylinder lock 34, 364 further includes at least one twisting tumbler pin, e.g., pin 366 of FIG. 16, oriented within the cylinder so as to be parallel to the height of the horizontally-oriented keyway 32, 368 and configured to be elevated and rotated by a complementary bitting formed on a first side surface 78, 342 of a key inserted into the keyway 32, 368.

A key includes a blade, such as such as blades 63, 63*a*, 63*b*, 270, 298, 298*a*, or 298*b* shown in FIGS. 3-6, 14-15, 18-21 wherein the blade has a cross sectional shape such that the key can be inserted into the horizontally-oriented keyway 32, 368 of the horizontal cylinder lock 34, 364. The cross sectional shape of the key is defined by only one blade segment 114, 304 corresponding to the third keyway segment 55, 390 of the horizontally-oriented keyway 32, 368 of the horizontal cylinder lock 34, 364 and lacking any blade segment that corresponds to the first 59, 386 or second 53, 388 keyway segments of the horizontally-oriented keyway 32, 368 as shown in FIG. 18 or 20. Alternatively, the cross sectional shape of the key is defined by only two blade segments corresponding to the second 53, 388 and third 55, 390 keyway segments of the horizontally-oriented keyway 32, 368 of the horizontal cylinder lock 34, 364 and lacking any blade segment that corresponds to the first keyway segment 59, 389 of the horizontally-oriented keyway 32, 368 as shown in FIG. 19 or 21.

The blade includes at least one bitting formed on the first side surface of the blade, and wherein the bitting is configured to elevate and rotate the at least one tumbler pin of the horizontal cylinder lock 34, 364.

In various embodiments, a key blank or modified key blank may be formed into a key to be used in a method for operating a horizontal cylinder lock, such as horizontal cylinder lock 34 in FIG. 2 and horizontal cylinder lock 364 shown in FIG. 16. The horizontal cylinder lock 34, 364 includes a housing, a cylinder rotatably disposed within the housing, and a horizontally-oriented keyway 32, 368 within the cylinder. The horizontally-oriented keyway 32, 368 has a height and a width that is greater than the height. The horizontally-oriented keyway 32, 368 is configured to receive a key blade, for example blade 63 as shown in FIG. 6 and key blade 298 shown in FIG. 15.

Referring to FIGS. 2 and 16, the horizontally-oriented keyway 32, 368 is divided into first keyway segment 59, 386, second keyway segment 53, 388, and third keyway segment 55, 390 along its width. The first keyway segment 59, 386 corresponds to the first blade segment 98, 300, the second keyway segment 53, 388 corresponds to the second blade segment 106, 302, and the third keyway segment 55, 390 corresponds to the third blade segment 114, 304. The horizontal cylinder lock 34, 364 further includes at least one twisting tumbler pin, e.g., pin 366 of FIG. 16, oriented within the cylinder so as to be parallel to the height of the horizontally-oriented keyway 32, 368 and configured to be elevated and rotated by a complementary bitting formed on a first edge 68 first side surface 78, 342 of a key inserted into the keyway 32, 368.

The method comprises inserting a key blade, such as such as blades 63, 63*a*, 63*b*, 270, 298, 298*a*, or 298*b* shown in FIGS. 3-6, 14-15, 18-21, into the horizontally-oriented keyway 32, 368, wherein the blade has a cross sectional shape such that the key can be inserted into the horizontally-oriented keyway 32, 368 of the horizontal cylinder lock 34, 364. The cross sectional shape of the key is defined by only one blade segment 114, corresponding to the third keyway segment 55, 390 of the horizontally-oriented keyway 32, 368 of the horizontal cylinder lock 34, 364 and lacking any blade segment that corresponds to the first 59, 386 or second 53, 388 keyway segments of the horizontally-oriented keyway 32, 368 as shown in FIG. 18 or 20. Alternatively, the cross sectional shape of the key is defined by only two blade segments corresponding to the second 53, 388 and third 55, 390 keyway segments of the horizontally-oriented keyway 32, 368 of the horizontal cylinder lock 34, 364 and lacking any blade segment that corresponds to the first keyway segment 59, 389 of the horizontally-oriented keyway 32, 368 as shown in FIG. 19 or 21. The blade includes at least one bitting formed on the first side surface 78, 342 of the blade, and the bitting is configured to elevate and rotate the at least one tumbler pin of the horizontal cylinder lock 34, 364. Inserting the key blade into the horizontally-oriented keyway 32, 368 comprises inserting the segment of blade 114, 304 corresponding to the third keyway segment 49, 384 into the third segment 49, 384 of the keyway.

While the subject matter of this disclosure has been described and shown in considerable detail with reference to certain illustrative embodiments, including various combinations and sub-combinations of features, those skilled in the art will readily appreciate other embodiments and variations and modifications thereof as encompassed within the scope of the present disclosure. Moreover, the descriptions of such embodiments, combinations, and sub-combinations is not intended to convey that the claimed subject matter requires features or combinations of features other than those expressly recited in the claims. Accordingly, the scope of this disclosure is intended to include all modifications and variations encompassed within the scope of the following appended claims.

The invention claimed is:

1. A key blank adapted to be formed into a key for operating a first cylinder lock having only a vertically-oriented keyway and tumbler pins engageable only by edge bittings of a key or a second cylinder lock having only a horizontally-oriented keyway and tumbler pins engageable only by side bittings of a key, the key blank comprising:

a key blade having a first edge, a second edge, a first side surface extending between the first edge and the second edge, and an opposed, second side surface extending between the first edge and the second edge, and wherein the first edge of the blade is adapted to have formed thereon one or more edge bittings configured to elevate and rotate tumbler pins of the first cylinder lock with the vertically-oriented keyway to open the first cylinder lock, and the first side surface is adapted to have formed thereon one or more side bittings configured to elevate and rotate tumbler pins of the second cylinder lock with the horizontally-oriented keyway to open the second cylinder lock.

2. The key blank of claim 1, wherein the key blade includes warding grooves and ridges on at least one of the first side surface and the second side surface that match the vertically-oriented keyway and the horizontally-oriented keyway so that the key blade can be inserted into both the vertically-oriented keyway and the horizontally-oriented keyway.

3. The key blank of claim 1, further comprising a longitudinal rib on the first side surface and extending along at least a portion of the blade, wherein the first side surface is adapted to receive the one or more side bittings in the longitudinal rib and a portion of the first side surface above the longitudinal rib.

4. The key blank of claim 1, wherein the first edge is adapted to receive one or more skewed edge bittings.

5. The key blank of claim 1, wherein the first side surface is adapted to receive one or more skewed side bittings.

6. The key blank of claim 1, wherein the first side surface is adapted to receive one or more side bittings extending to the second edge of the blade.

7. The key blank of claim 1, wherein the first side surface is adapted to receive one or more side bittings extending from the second edge of the blade to beyond a longitudinal axis of the blade.

8. The key blank of claim 1, wherein the key blade is divided into three segments between the first edge and the second edge, the segments comprising:

(i) a first segment encompassed by a first envelope defined by the first edge of the key blade, a first side boundary, a second side boundary, and a lower edge, wherein the first side boundary and the second side boundary of the first envelope have a first thickness therebetween, and the first side boundary and the second side boundary of the first envelope are equidistant from a centerline extending through the blade from the first edge of the blade to the second edge of the blade;

(ii) a second segment encompassed by a second envelope defined by an upper boundary contiguous with the lower boundary of the first segment, a first side boundary, a second side boundary, and a lower boundary, wherein the first side boundary and the second side boundary of the second envelope have a second thickness therebetween, the first side boundary and the second side boundary of the second envelope are equidistant from the centerline, and the second thickness is greater than the first thickness; and (iii) a third segment encompassed by a third envelope defined by an upper boundary contiguous with the lower boundary of the second segment, a first side boundary, a second side boundary, and the second edge of the key blade, wherein the first side boundary and the second side boundary of the third envelope have a third thickness therebetween, and wherein the distance from the centerline to the second side boundary of the third envelope is equal to the distance from the centerline to the second side boundary of the second envelope, and the third thickness is greater than the first thickness and the second thickness.

9. The key blank of claim 8, wherein the first side surface is adapted to receive one or more side bittings in the first side boundary of the third segment.

10. The key blank of claim 8, wherein the key blade further includes a warding groove formed in at least one of the second segment and the third segment that extends to a depth beyond the centerline.

11. The key blank of claim 1, wherein the first side surface of the key blade and the second side surface of the key blade comprise horizontal warding surfaces, wherein the horizontal warding surfaces are perpendicular to a vertical axis extending from the first edge of the blade to the second edge of the blade.

12. The key blank of claim 1, wherein first and second side boundaries of a first portion of the key blade are equidistant from a centerline extending from the first edge of the blade to the second edge of the blade and first and second side boundaries of a second portion of the key blade is are not equidistant from the centerline, and wherein the first edge of the blade adapted to receive the one or more edge bittings is part of the first portion of the blade and wherein the second portion of the blade defines part of the first side surface adapted to receive the one or more side bittings.

13. The key blank of claim 1, wherein the key blade further includes a warding groove formed in the first side surface or the second side surface that extends to a depth beyond a centerline extending from the first edge to the second edge.

14. The key blank of claim 1, wherein the key blade includes:

an edge bevel extending from a distal end of the blade to the first edge of the blade and configured to guide tumbler pins of the first cylinder lock with the vertically-oriented keyway to the first edge of the key blade as the key blade is inserted into the vertically-oriented keyway; and a side bevel extending from the distal end of the blade to the first side surface of the blade and configured to guide tumbler pins of the second cylinder lock with the horizontally-oriented keyway to the first side surface of the key blade as the key blade is inserted into the horizontally-oriented keyway.

15. A cylinder lock comprising a keyway, wherein the keyway corresponds to a shape of the key blade of the key blank of claim 1.

16. The cylinder lock of claim 15, wherein the keyway is the vertically-oriented keyway.

17. The cylinder lock of claim 15, wherein the keyway is the horizontally-oriented keyway.

18. A key for a lock, the key comprising:

a key blade having a top edge, a bottom edge, a first side surface, and an opposed second side surface, wherein the first side surface comprises one or more side bittings configured to elevate and rotate one or more tumbler pins of a horizontal lock, wherein the blade is divided into three segments between the top edge and the bottom edge, the segments comprising:

(i) a first segment encompassed by a first envelope defined by the top edge of the key blade, a first side boundary, a second side boundary, and a lower boundary, wherein the first side boundary and the second side boundary of the first envelope have a first thickness therebetween, and the first side boundary and the second side boundary of the first envelope are equidistant from a centerline extending through the blade from the top edge of the blade to the bottom edge of the blade;

(ii) a second segment encompassed by a second envelope defined by an upper boundary contiguous with the lower boundary of the first segment, a first side boundary, a second side boundary, and a lower boundary, wherein the first side boundary and the second side boundary of the second envelope have a second thickness therebetween, the first side boundary and the second side boundary of the second envelope are equidistant from the centerline, and the second thickness is greater than the first thickness; and (iii) a third segment encompassed by a third envelope defined by an upper boundary contiguous with the lower boundary of the second segment, a first side boundary, a second side boundary, and the bottom edge of the key blade, wherein the first side boundary and the second side boundary of the third envelope have a third thickness therebetween, and wherein the distance from the centerline to the second side boundary of the third envelope is equal to the distance from the centerline to the second side boundary of the second envelope, and the third thickness is greater than the first thickness and the second thickness.

19. The key of claim 18, further comprising a longitudinal rib on the first side surface and extending along at least a portion of the blade, wherein the side bittings are formed in the longitudinal rib and a portion of the first side surface above the longitudinal rib.

20. The key of claim 18, wherein the top edge comprises one or more edge bittings configured to elevate and rotate one or more vertically-oriented tumbler pins of a vertical lock.

21. The key of claim 20, wherein the first side surface of the key blade and the second side surface of the key blade comprise horizontal warding surfaces between the top edge of the key blade and a maximum depth of a valley of the edge bitting, wherein the horizontal warding surfaces are perpendicular to a vertical axis extending from the top edge of the blade to the bottom edge of the blade.

22. The key of claim 21, wherein the maximum depth of a valley of an edge bitting is not more than two-thirds the height of an unbitted key blade.

23. The key of claim 20, wherein the first side surface of the key blade and the second side surface of the key blade comprise horizontal warding surfaces and outwardly-extending warding surfaces between the top edge of the key blade and a maximum depth of a valley of the edge bitting.

24. The key of claim 18, wherein at least one the one or more side bittings extends to the bottom edge of the key blade.

25. The key of claim 18, wherein the side bittings do not extend through more than half of the thickness of the key blade.

26. The key of claim 18, wherein each side bitting has a base at an angle of 70-110 degrees with respect to a longitudinal axis of the blade.

27. The key of claim 18, wherein at least one of the one or more side bittings extends from the bottom edge of the key blade to beyond a longitudinal axis of the key blade.

28. The key of claim 27, wherein each side bitting has a base at an angle of 70-110 degrees with respect to the longitudinal axis of the blade.

29. The key of claim 18, wherein the thickness of first segment envelope is about 0.060 inch, the thickness of the second segment envelope is about 0.093 inch, and the thickness of third segment envelope is about 0.125 inch.

30. The key of claim 18, wherein the blade has only vertical warding surfaces cut into the first side surface.

31. The key of claim 18, wherein at least one of the first side surface and the second side surface of the key blade comprises at least one vertical warding surface and at least one horizontal warding surfaces.

32. A cylinder lock comprising a keyway, wherein the keyway corresponds to the shape of the key of claim 18.

33. A lock system comprising:

A a vertical cylinder lock comprising:

1. A housing;
2. A cylinder rotatably disposed within the housing;
3. A vertically-oriented keyway within the cylinder, wherein the vertically-oriented keyway has a height and a width that is less than the height, and wherein the vertically-oriented keyway is configured to receive a key blade having a first edge, a second edge, a first side surface, and an opposed second side surface defining a cross sectional shape of the key blade, wherein the cross sectional shape of a key blade that the vertically oriented keyway is configured to receive is divided into three blade segments between the first edge and the second edge, the segments comprising:
   (i) a first blade segment encompassed by a first envelope defined by the first edge of the key blade, a first side boundary contacting a portion of the first side surface of the key blade, a second side boundary contacting a portion of the second side surface of the key blade, and a lower boundary, wherein the first side boundary and the second side boundary of the first envelope have a first thickness therebetween, wherein and the first side boundary and the second side boundary of the first envelope are equidistant from a centerline extending through the key blade from the first edge of the key blade to the second edge of the key blade;
   (ii) a second blade segment encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary, wherein the first side boundary and the second side boundary of the second envelope have a second thickness therebetween, wherein the first side boundary and the second side boundary of the second envelope are equidistant from the centerline, and wherein the second thickness is greater than the first thickness; and
   (iii) a third blade segment encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade, wherein the first side boundary and the second side boundary of the third envelope have a third thickness therebetween, wherein the distance from the centerline to the second side boundary of the third envelope is equal to the distance from the centerline to the second side boundary of the second envelope, and wherein the third thickness is greater than the first thickness and the second thickness, and wherein the vertically-oriented keyway is divided into first, second, and third keyway segments along its height, wherein the first keyway segment corresponds to the first blade segment, the second keyway segment corresponds to the second blade segment, and the third keyway segment corresponds to the third blade segment; and
4. at least one twisting tumbler pin oriented within the cylinder so as to be parallel to the height of the vertically-oriented keyway and configured to be elevated and rotated by a complementary bitting formed on a first edge of a key inserted into the keyway;

B a horizontal cylinder lock comprising:

1 a housing;

2 a cylinder rotatably disposed within the housing;

3 a horizontally-oriented keyway within the cylinder, wherein the horizontally-oriented keyway has a height and a width that is greater than the height, and wherein the horizontally-oriented keyway is configured to receive a key blade having a first edge, a second edge, a first side surface, and an opposed second side surface defining a cross sectional shape of the key blade that is divided into the same first blade segment, second blade segment, and third blade segment as the cross sectional shape of the key blade the vertically-oriented keyway of the vertical cylinder lock is configured to receive, and wherein the horizontally-oriented keyway is divided into first, second, and third keyway segments along its width, wherein the second keyway segment corresponds to the second blade segment and the third keyway segment corresponds to the third blade segment;

4 at least one twisting tumbler pin oriented within the cylinder so as to be parallel to the height of the keyway and configured to be elevated and rotated by a complementary bitting formed on a first side surface of a key inserted into the keyway, and wherein the tumbler pin of the horizontal cylinder lock is primarily aligned with the third keyway segment of the horizontally-oriented keyway; and C a key with a blade having a first edge, a second edge, a first side surface, and an opposed second side surface defining a cross sectional shape such that the key can be inserted into both the vertically-oriented keyway of the vertical cylinder lock and the horizontally-oriented keyway of the horizontal cylinder lock, wherein the cross sectional shape of the key is defined by at least one blade segment corresponding to the third keyway segment of the vertically-oriented keyway of the vertical cylinder lock and the third keyway segment of the horizontally-oriented keyway of the horizontal cylinder lock, and wherein the key has at least a bitting formed on the first side surface of the key and configured to elevate and rotate the at least one tumbler pin of the horizontal cylinder lock.

34. The lock system of claim 33, wherein the key has a bitting formed on the first edge and configured to elevate and rotate the at least one tumbler of the vertical cylinder lock.

35. The lock system of claim 34, wherein the key blade includes:

an edge bevel extending from a distal end of the blade to the first edge of the blade and configured to guide tumbler pins of a cylinder lock with a vertically-oriented keyway to the first edge of the key blade as the key blade is inserted into the vertically-oriented keyway; and a side bevel extending from a distal end of the blade to the first side surface of the blade and configured to guide tumbler pins of a cylinder lock with a horizontally-oriented keyway to the first side surface of the key blade as the key blade is inserted into the horizontally-oriented keyway.

36. The lock system of claim 33, wherein the cross sectional shape of the key blade is defined by (i) a first blade segment encompassed by a first envelope defined by the first edge of the key blade, a first side boundary contacting a portion of the first side surface of the key blade, a second side boundary contacting a portion of the second side surface of the key blade, and a lower boundary, wherein the first side boundary and the second side boundary of the first envelope have a first thickness therebetween, wherein and the first side boundary and the second side boundary of the first envelope are equidistant from a centerline extending through the key blade from the first edge of the key blade to the second edge of the key blade; (ii) a second blade segment encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary, wherein the first side boundary and the second side boundary of the second envelope have a second thickness therebetween, wherein the first side boundary and the second side boundary of the second envelope are equidistant from the centerline, and wherein the second thickness is greater than the first thickness; and (iii) a third blade segment encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade, wherein the first side boundary and the second side boundary of the third envelope have a third thickness therebetween, wherein the distance from the centerline to the second side boundary of the third envelope is equal to the distance from the centerline to the second side boundary of the second envelope, and wherein the third thickness is greater than the first thickness and the second thickness.

37. The lock system of claim 36, wherein the key blade further includes a warding groove formed in at least one of the second segment and the third segment that extends to a depth beyond the centerline.

38. The lock system of claim 33, wherein the at least one bitting formed on the first side surface extends to the second edge of the blade.

39. The lock system of claim 38, wherein the at least one bitting formed on the first side surface extends from the second edge of the blade to beyond a longitudinal axis of the blade.

40. A key for a horizontal cylinder lock that includes a housing, a cylinder rotatably disposed within the housing, and a horizontally-oriented keyway within the cylinder, wherein the horizontally-oriented keyway has a height and a width that is greater than the height, and wherein the horizontally-oriented keyway is configured to receive a key blade having a first edge, a second edge, a first side surface, and an opposed second side surface defining a cross sectional shape of the key blade, and wherein the cross-sectional shape of the key blade the horizontally-oriented keyway is configured to receive is divided into three blade segments between the first edge and the second edge, the segments comprising (i) a first blade segment encompassed by a first envelope defined by the first edge of the key blade, a first side boundary contacting a portion of the first side surface of the key blade, a second side boundary contacting a portion of the second side surface of the key blade, and a lower boundary, wherein the first side boundary and the second side boundary of the first envelope have a first thickness therebetween, wherein and the first side boundary and the second side boundary of the first envelope are equidistant from a centerline extending through the key blade from the first edge of the key blade to the second edge of the key blade, (ii) a second blade segment encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary, wherein the first side boundary and the second side boundary of the second envelope have a second thickness therebetween, wherein the first side boundary and the second side boundary of the second envelope are equidistant from the centerline, and wherein the second thickness is greater than the first thickness, and (iii) a third blade segment encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade, wherein the first side boundary and the second side boundary of the third envelope have a third thickness therebetween, wherein the distance from the centerline to the second side boundary of the third envelope is equal to the distance from the centerline to the second side boundary of the second envelope, and wherein the third thickness is greater than the first thickness and the second thickness, and wherein the horizontally-oriented keyway is divided into first, second, and third keyway segments along its height, wherein the first keyway segment corresponds to the first blade segment, the second keyway segment corresponds to the second blade segment, and the third keyway segment corresponds to the third blade segment, and wherein the horizontal cylinder lock further includes at least one twisting tumbler pin oriented within the cylinder so as to be parallel to the height of the horizontally-oriented keyway and configured to be elevated and rotated by a complementary bitting formed on a first side of a key inserted into the keyway, wherein the key comprises:

a blade having a first edge, a second edge, a first side surface, and an opposed second side surface defining a cross sectional shape such that the key can be inserted into the horizontally-oriented keyway of the horizontal cylinder lock, wherein the cross sectional shape of the key is defined by:

(i) only one blade segment corresponding to the third keyway segment of the horizontally-oriented keyway of the horizontal cylinder lock and lacking any blade segment that corresponds to the first or second keyway segments of the horizontally-oriented keyway, or (ii) only two blade segments corresponding to the second and third keyway segments of the horizontally-oriented keyway of the horizontal cylinder lock and lacking any blade segment that corresponds to the first keyway segment of the horizontally-oriented keyway, and wherein the blade includes at least one bitting formed on the first side surface of the blade, and wherein the at least one bitting is configured to elevate and rotate the at least one tumbler pin of the horizontal cylinder lock.

41. The key of claim 40, wherein the at least one bitting formed on the first side surface extends to the second edge of the blade.

42. The key of claim 40, wherein the at least one bitting formed on the first side surface extends from the second edge of the blade to beyond a longitudinal axis of the blade.

43. A method for operating a horizontal cylinder lock, wherein the horizontal cylinder lock includes a housing, a cylinder rotatably disposed within the housing, and a horizontally-oriented keyway within the cylinder, wherein the horizontally-oriented keyway has a height and a width that is greater than the height, and wherein the horizontally-oriented keyway is configured to receive a key blade having a first edge, a second edge, a first side surface, and an opposed second side surface defining a cross sectional shape of the key blade, and wherein the cross-sectional shape of the key blade the horizontally-oriented keyway is configured to receive is divided into three blade segments between the first edge and the second edge, the segments comprising (i) a first blade segment encompassed by a first envelope defined by the first edge of the key blade, a first side boundary contacting a portion of the first side surface of the key blade, a second side boundary contacting a portion of the second side surface of the key blade, and a lower boundary, wherein the first side boundary and the second side boundary of the first envelope have a first thickness therebetween, wherein and the first side boundary and the second side boundary of the first envelope are equidistant from a centerline extending through the key blade from the first edge of the key blade to the second edge of the key blade, (ii) a second blade segment encompassed by a second envelope defined by an upper boundary contiguous with the lower boundary of the first segment, a first side boundary contacting a portion of the first side surface of the key blade, a second side boundary contacting a portion of the second side surface of the key blade, and a lower boundary, wherein the first side boundary and the second side boundary of the second envelope have a second thickness therebetween, wherein the first side boundary and the second side boundary of the second envelope are equidistant from the centerline, and wherein the second thickness is greater than the first thickness, and (iii) a third blade segment encompassed by a third envelope defined by an upper boundary contiguous with the lower boundary of the second segment, a first side boundary contacting a portion of the first side surface of the key blade, a second side boundary contacting a portion of the second side surface of the key blade, and the second edge of the key blade, wherein the first side boundary and the second side boundary of the third envelope have a third thickness therebetween, wherein the distance from the centerline to the second side boundary of the third envelope is equal to the distance from the centerline to the second side boundary of the second envelope, and wherein the third thickness is greater than the first thickness and the second thickness, and wherein the horizontally-oriented keyway is divided into first, second, and third keyway segments along its height, wherein the first keyway segment corresponds to the first blade segment, the second keyway segment corresponds to the second blade segment, and the third keyway segment corresponds to the third blade segment, and wherein the horizontal cylinder lock further includes at least one twisting tumbler pin oriented within the cylinder so as to be parallel to the height of the horizontally-oriented keyway and configured to be elevated and rotated by a complementary bitting formed on a first side of a key inserted into the keyway, wherein the method comprises:

inserting a key blade into the horizontally-oriented keyway, wherein the key blade has a first edge, a second edge, a first side surface, and an opposed second side surface defining a cross sectional shape such that the key can be inserted into the horizontally-oriented keyway of the horizontal cylinder lock, wherein the cross sectional shape of the key is defined by:

(iii) only one blade segment corresponding to the third keyway segment of the horizontally-oriented keyway of the horizontal cylinder lock and lacking any blade segment that corresponds to the first or second keyway segments of the horizontally-oriented keyway, or (iv) only two blade segments corresponding to the second and third keyway segments of the horizontally-oriented keyway of the horizontal cylinder lock and lacking any blade segment that corresponds to the first keyway segment of the horizontally-oriented keyway, and wherein the blade includes at least one bitting formed on the first side surface of the blade, and wherein the at least one bitting is configured to elevate and rotate the at least one tumbler pin of the horizontal cylinder lock, and wherein inserting the key blade into the horizontally-oriented keyway comprises inserting the segment of blade corresponding to the third keyway segment into the third segment of the keyway.

44. The method of claim 43, wherein the at least one bitting formed on the first side surface extends to the second edge of the blade.

45. The method of claim 43, wherein the at least one bitting formed on the first side surface extends from the second edge of the blade to beyond a longitudinal axis of the blade.

* * * * *